(12) United States Patent
Jia et al.

(10) Patent No.: US 11,507,424 B2
(45) Date of Patent: Nov. 22, 2022

(54) OPTIMIZATION OF RESOURCE USAGE IN CROSS-REALITY SESSIONS

(71) Applicant: AT&T Intellectual Property I, L.P., Atlanta, GA (US)

(72) Inventors: Yupeng Jia, Austin, TX (US); James Pratt, Round Rock, TX (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/929,586

(22) Filed: Jul. 15, 2020

(65) Prior Publication Data

US 2022/0019470 A1    Jan. 20, 2022

(51) Int. Cl.
| | |
|---|---|
| G06F 3/01 | (2006.01) |
| G06F 9/50 | (2006.01) |
| G06F 8/65 | (2018.01) |
| H04L 41/14 | (2022.01) |
| G06T 11/00 | (2006.01) |

(52) U.S. Cl.
CPC ............ *G06F 9/5027* (2013.01); *G06F 3/011* (2013.01); *G06F 8/65* (2013.01); *G06T 11/00* (2013.01); *H04L 41/14* (2013.01); *G06T 2210/08* (2013.01); *G06T 2210/36* (2013.01)

(58) Field of Classification Search
CPC .......... G06F 3/011; G06F 9/5027; G06F 8/65; H04L 41/14; G06T 2210/08; G06T 2210/36; G06T 11/00
See application file for complete search history.

(56) References Cited

U.S. PATENT DOCUMENTS

| | | | |
|---|---|---|---|
| 11,126,320 B1* | 9/2021 | Thompson | G06F 3/0482 |
| 2003/0184541 A1* | 10/2003 | Tackett | G06T 15/00 |
| | | | 345/419 |
| 2014/0071163 A1* | 3/2014 | Kinnebrew | G03H 1/2249 |
| | | | 345/633 |
| 2016/0093078 A1* | 3/2016 | Davis | G11B 27/031 |
| | | | 345/629 |
| 2017/0316607 A1* | 11/2017 | Khalid | G02B 27/0172 |
| 2018/0063504 A1* | 3/2018 | Haines | H04N 7/183 |
| 2019/0327467 A1* | 10/2019 | Chou | H04N 19/177 |
| 2020/0167989 A1* | 5/2020 | Castaneda | G06T 19/20 |
| 2020/0250372 A1* | 8/2020 | Remington | H04L 67/38 |

(Continued)

*Primary Examiner* — Phi Hoang
(74) *Attorney, Agent, or Firm* — Hartman & Citrin LLC

(57) ABSTRACT

Concepts and technologies are disclosed herein for optimization of resource usage in cross-reality sessions. A computer can receive a request for a cross-reality session, determine entities to be included in the cross-reality session, and optimize resource usage during the cross-reality session. Optimized cross-reality session data can be provided to a device to generate a cross-reality environment that can include the one entity of the entities rendered in the first level of detail. Attention data that can describe interactions in the cross-reality environment can be obtained. The resource usage can be re-optimized based on the attention data. Re-optimizing the resource usage can include determining that the one entity of the entities is to be rendered in a second level of detail that is greater than the first level of detail. An update can be delivered to the device, which can use the update to update the cross-reality environment.

20 Claims, 8 Drawing Sheets

(56) References Cited

U.S. PATENT DOCUMENTS

| | | | |
|---|---|---|---|
| 2020/0379803 A1* | 12/2020 | Saillet | G06F 9/5027 |
| 2020/0401576 A1* | 12/2020 | Yerli | G06F 9/46 |
| 2020/0409519 A1* | 12/2020 | Faulkner | H04N 21/4621 |
| 2021/0011607 A1* | 1/2021 | Ziman | G06T 19/003 |
| 2021/0304706 A1* | 9/2021 | Petrangeli | G06F 16/9577 |
| 2021/0343082 A1* | 11/2021 | Kim | G06T 9/001 |

* cited by examiner

OPTIMIZATION OF RESOURCE USAGE IN CROSS-REALITY SESSIONS

BACKGROUND

The term "cross-reality," also referred to as "X Reality" or "XR," can be used to refer to fully or partially virtual environments. These environments may be generated and/or interacted with using hardware and/or software, which collectively can provide a "new reality" using software-generated visual and/or audio elements (also known as virtual reality), optionally in combination with one or more sensory devices. The sensory interfaces can enable cross-reality environments to surpass virtual reality and/or augmented reality environments, in terms of immersion, by providing sensory inputs to users beyond sight and sound. Generating such cross-reality environments, however, can be computationally intensive, bandwidth intensive (in the case of networked embodiments), and/or otherwise can be expensive in computing terms to provide to a user.

In some cross-reality environments, complex environments (including objects, structures, characters, textures, wind, scents, audio, etc.) may be pre-loaded so that the user can look and/or move in any direction and interact with various aspects of the environment. For example, a rendered environment may be created in three hundred sixty degrees about a user in the virtual environment. Generating these complex environments can require waiting time (e.g., for downloading, for rendering, etc.), can cause delays due to the intensive network usage that may be required, and/or otherwise can pose computing challenges that can adversely affect performance and the resulting user experience.

Trigger points can be created in some environments. The triggers can, when encountered, cause the computing device to request and/or render one or more components of a scene or other environment. Using trigger points, however, may not obviate the challenges mentioned above. Rather, the timing of these rendering operations may be unplanned, in some instances, and therefore the requesting and/or rendering operations may still adversely affect performance because these operations may occur at inconvenient times. Additionally, these approaches may still render the entire environment and therefore latency and/or wait times may result.

SUMMARY

The present disclosure is directed to optimization of resource usage in cross-reality sessions. As used herein, "resources" can refer to and can include compute resources, network resources, data storage resources, and/or other computing resources that may be used to provide a user with a cross-reality experience. Thus, optimization of resource usage can improve the user experience by decreasing latency and/or other delays that may result from unnecessary rendering, data transmission, data downloads and/or uploads, combinations thereof, or the like. According to various embodiments of the concepts and technologies disclosed herein, a user device can request a cross-reality session, for example, from a cross-reality service. The cross-reality service can determine various aspects (materials, structures, objects, storylines, plots, characters, etc.) of the cross-reality session. The cross-reality service can determine whether entities in the cross-reality session are to be rendered in low detail, high detail, or intermediate detail; what device is to render the entities; whether that level of detail is likely to change during the cross-reality session; combinations thereof; or the like. The initial determination can be based on expected interactions and/or known history of the user, as well as resource expectations. In particular, the cross-reality service can determine resources that are expected to be needed to provide the cross-reality session to the user, and resource availability (known or expected) during the cross-reality session. The cross-reality service also can access one or more libraries to determine how the user is expected to interact with the cross-reality environment, if aspects of the cross-reality session have previously been rendered, if the cross-reality session pattern is known, etc., all of which can be used to reduce the computing resources needed at any particular time.

Based on these and other considerations, the cross-reality service can determine how to optimize the cross-reality session and can generate an optimized version of cross-reality session data. The cross-reality session data can be used to generate the cross-reality session at cross-reality equipment. The cross-reality session data can include renderable graphics and/or other data that can be generated by the server computer, in some embodiments. The cross-reality session data also can instruct other devices (e.g., the user device, the cross-reality equipment, and/or other devices) to render and/or generate parts of the cross-reality session, and therefore can include library references and/or other descriptions that can be used to render the parts of the cross-reality session. In various embodiments, the cross-reality session data can include at least one entity (e.g., an object) rendered at a low level of detail, either by a device that hosts the cross-reality service (e.g., a server computer) or by other devices such as the user device and/or the cross-reality equipment. The cross-reality session data can be provided to the user device and the cross-reality session can be commenced.

During the cross-reality session, the user device (e.g., via execution of the cross-reality application) can track movements of the user, interactions of the user with entities of the cross-reality environment, a focus of the user (e.g., where the user is looking) in the cross-reality environment, combinations thereof, or the like. The user device (or other device) can generate attention data, which can represent movements, focus, and/or interactions of the user in the cross-reality environment. In various embodiments, the attention data can indicate that the user (or the point of view of the user in the cross-reality environment) has moved closer to and/or has interacted with the object or other entity that was originally rendered in a low level of detail.

In response to this determination, the server computer can determine that the entity previously rendered in a low level of detail should be rendered in a relatively higher level of detail (e.g., an intermediate level of detail, a high level of detail, etc.). The server computer can re-optimize the cross-reality session based on the libraries, and generate a new iteration of the cross-reality session data and/or an update that, when received by a device, causes the device to make changes to the existing session. The updates and/or the cross-reality session data can be provided to the user device and/or the cross-reality equipment. The cross-reality session can be updated to avoid wasting resources on rendering objects or other entities that the user has no interest in, yet supporting the possibility that the user may wish to interact with or view that object in high detail. Thus, embodiments of the concepts and technologies disclosed herein can provide progressive loading of the cross-reality environment based on interactions of the user, thereby providing an interest-based and/or interaction-based cross-reality environment that can optimize resource usage and/or minimize resource waste. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include receiving, from a device, a request for a cross-reality session; determining entities to be included in the cross-reality session; and optimizing resource usage during the cross-reality session. The resource usage can relate to resources including network resources and computing resources. Optimizing the resource usage can include identifying one entity of the entities that is to be rendered in a first level of detail that is less than a maximum level of detail. The operations further can include providing, to the device, optimized cross-reality session data. The device can use the optimized cross-reality session data to generate a cross-reality environment, and the cross-reality environment can include the one entity of the entities rendered in the first level of detail. The operations further can include obtaining attention data that can describe interactions in the cross-reality environment. The interactions can include one of an interaction with the one entity of the entities or a focus of attention on the one entity of the entities in the cross-reality environment. The operations further can include re-optimizing the resource usage during the cross-reality session. Re-optimizing the resource usage can include determining that the one entity of the entities is to be rendered in a second level of detail that is greater than the first level of detail. The operations also can include delivering, to the device, an update. The device can use the update to update the cross-reality environment, and the cross-reality environment can include the one entity of the entities rendered in the second level of detail.

In some embodiments, delivering the update further can include generating the update. In some embodiments, the attention data describes a focus of attention of a user, the focus of attention including the one entity of the entities. In some embodiments, the interaction can include a manipulation of the one entity of the entities. In some embodiments, the update can include an updated version of the optimized cross-reality session data.

In some embodiments, optimizing the resource usage can include predicting resources that are to be used to provide the cross-reality session; predicting availability of the resources during the cross-reality session; predicting attention of a user during the cross-reality session; and determining rendering levels for the entities based on the attention, the resources, and the availability of the resources. In some embodiments, the computer-executable instructions, when executed by the processor, can cause the processor to perform operations further including receiving feedback, the feedback describing network performance and attention of the user during the cross-reality session; and updating, based on the feedback, an optimization of the cross-reality session. In some embodiments, the system further can include cross-reality equipment. The cross-reality equipment can include a cross-reality headset including a display, a camera, and a sensory interface, wherein the one entity of the entities is displayed on the display, wherein the interaction is captured by the camera, and wherein the cross-reality environment can include an output from the sensory interface.

According to another aspect of the concepts and technologies disclosed herein, a method is disclosed. The method can include receiving, at a computer including a processor and from a device, a request for a cross-reality session; determining, by the processor, entities to be included in the cross-reality session; and optimizing, by the processor, resource usage during the cross-reality session. The resource usage can relate to resources including network resources and computing resources. Optimizing the resource usage can include identifying one entity of the entities that is to be rendered in a first level of detail that is less than a maximum level of detail. The method further can include providing, by the processor and to the device, optimized cross-reality session data. The device can use the optimized cross-reality session data to generate a cross-reality environment, and the cross-reality environment can include the one entity of the entities rendered in the first level of detail. The method further can include obtaining, by the processor, attention data that can describe interactions in the cross-reality environment. The interactions can include one of an interaction with the one entity of the entities or a focus of attention on the one entity of the entities in the cross-reality environment. The method further can include re-optimizing, by the processor, the resource usage during the cross-reality session. Re-optimizing the resource usage can include determining that the one entity of the entities is to be rendered in a second level of detail that is greater than the first level of detail. The method also can include delivering, by the processor and to the device, an update. The device can use the update to update the cross-reality environment, and the cross-reality environment can include the one entity of the entities rendered in the second level of detail.

In some embodiments, the attention data describes a focus of attention of a user, the focus of attention including the one entity of the entities. In some embodiments, the interaction can include a manipulation of the one entity of the entities. In some embodiments, the update can include an updated version of the optimized cross-reality session data. In some embodiments, optimizing the resource usage can include predicting resources that are to be used to provide the cross-reality session; predicting availability of the resources during the cross-reality session; predicting attention of a user during the cross-reality session; and determining rendering levels for the entities based on the attention, the resources, and the availability of the resources. In some embodiments, the method further can include receiving feedback, the feedback describing network performance and attention of the user during the cross-reality session; and updating, based on the feedback, an optimization of the cross-reality session.

According to yet another aspect of the concepts and technologies disclosed herein, a computer storage medium is disclosed. The computer storage medium can store computer-executable instructions that, when executed by a processor, cause the processor to perform operations. The operations can include receiving, from a device, a request for a cross-reality session; determining entities to be included in the cross-reality session; and optimizing resource usage during the cross-reality session. The resource usage can relate to resources including network resources and computing resources. Optimizing the resource usage can include identifying one entity of the entities that is to be rendered in a first level of detail that is less than a maximum level of detail. The operations further can include providing, to the device, optimized cross-reality session data. The device can use the optimized cross-reality session data to generate a cross-reality environment, and the cross-reality environment can include the one entity of the entities rendered in the first level of detail. The operations further can include obtaining attention data that can describe interactions in the cross-reality environment. The interactions can include one of an interaction with the one entity of the entities or a focus of attention on the one entity of the entities in the cross-reality environment. The operations further can include re-optimizing the resource usage during the cross-reality session. Re-optimizing the resource usage can include determining that the one entity of the entities is to be rendered in a second level of detail that is greater than the first level of detail. The operations also can include delivering, to the device, an update. The device can use the update to update the cross-reality environment, and the cross-reality environment can include the one entity of the entities rendered in the second level of detail.

In some embodiments, the attention data describes a focus of attention of a user, the focus of attention including the one entity of the entities. In some embodiments, the interaction can include a manipulation of the one entity of the entities. In some embodiments, the update can include an updated version of the optimized cross-reality session data. In some embodiments, optimizing the resource usage can include predicting resources that are to be used to provide the cross-reality session; predicting availability of the resources during the cross-reality session; predicting attention of a user during the cross-reality session; and determining rendering levels for the entities based on the attention, the resources, and the availability of the resources. In some embodiments, operations further can include receiving feedback, the feedback describing network performance and attention of the user during the cross-reality session; and updating, based on the feedback, an optimization of the cross-reality session.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
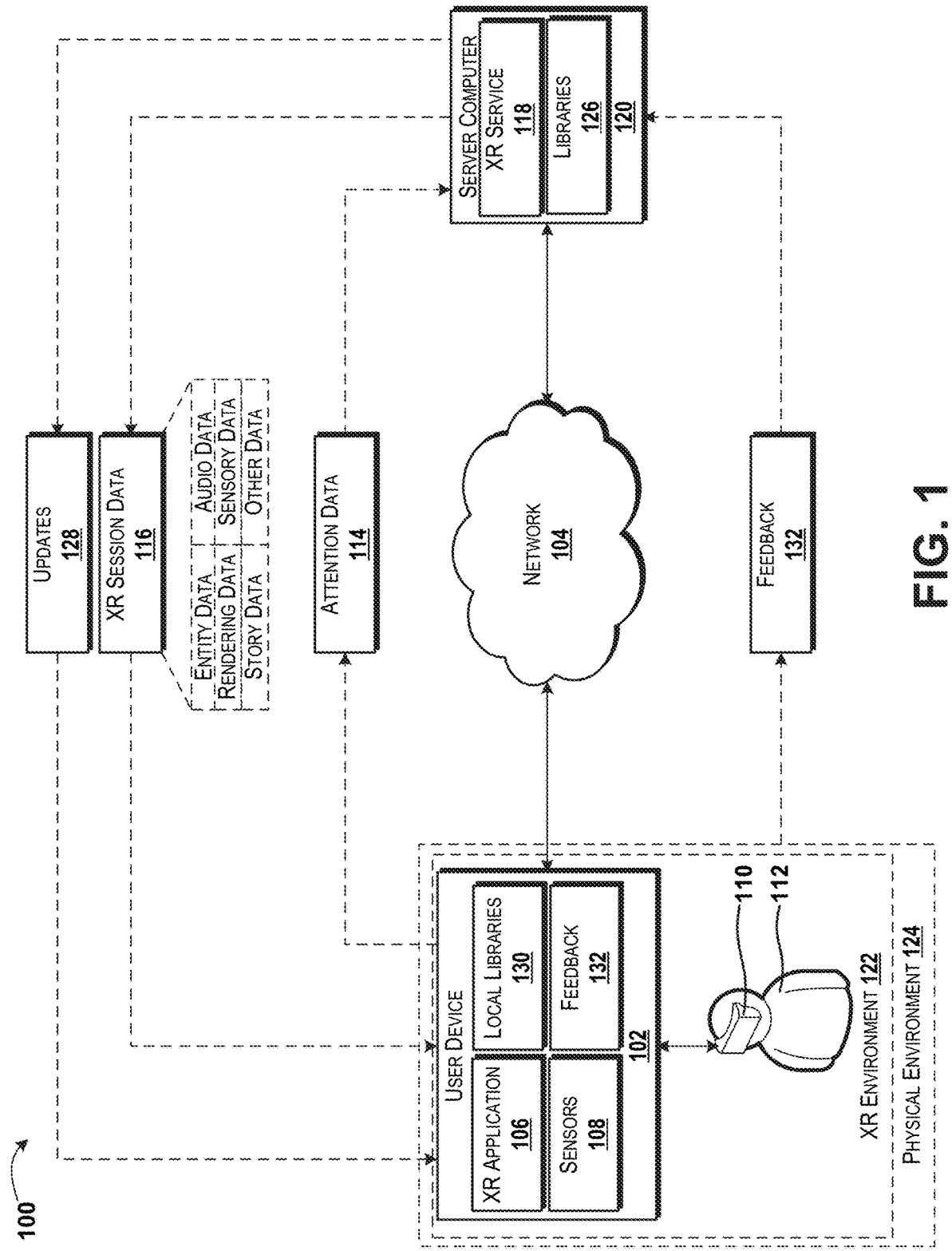
FIG. 1 is a system diagram illustrating an illustrative operating environment for various embodiments of the concepts and technologies described herein.

The following detailed description is directed to optimization of resource usage in cross-reality sessions. According to various embodiments of the concepts and technologies disclosed herein, a user device can request a cross-reality session, for example from a cross-reality service. The cross-reality service can determine various aspects (materials, structures, objects, storylines, plots, characters, etc.) of the cross-reality session. The cross-reality service can determine whether entities in the cross-reality session are to be rendered in low detail, high detail, or intermediate detail; what device is to render the entities; whether that level of detail is likely to change during the cross-reality session; combinations thereof; or the like. The cross-reality service also can determine resources that are expected to be needed to provide the cross-reality session, and resource availability (known or expected) during the cross-reality session. The cross-reality service also can access one or more libraries to determine how the user is expected to interact with the cross-reality environment, if aspects of the cross-reality session have previously been rendered, if the cross-reality session pattern is known, etc.

Based on these and other considerations, the cross-reality service can determine how to optimize the cross-reality session and generate an optimized version of cross-reality session data. The cross-reality session data can be used to generate the cross-reality session at cross-reality equipment. The cross-reality session data can include renderable graphics and/or other data that can be generated by the server computer, in some embodiments. The cross-reality session data also can instruct other devices (e.g., the user device, the cross-reality equipment, and/or other devices) to render and/or generate parts of the cross-reality session. In various embodiments, the cross-reality session data can include at least one entity (e.g., an object) rendered at a low level of detail, either by a device that hosts the cross-reality service (e.g., a server computer) or by other devices such as the user device and/or the cross-reality equipment. The cross-reality session data can be provided to the user device and the cross-reality session can commence.

During the cross-reality session, the user device (e.g., via execution of the cross-reality application) can track movements of the user, interactions of the user with entities of the cross-reality environment, a focus of the user (e.g., where the user is looking) in the cross-reality environment, combinations thereof, or the like. The user device (or other device) can generate attention data, which can represent movements, focus, and/or interactions of the user in the cross-reality environment. In various embodiments, the attention data can indicate that the user (or the point of view of the user in the cross-reality environment) has moved closer to and/or has interacted with the object or other entity that was originally rendered in a low level of detail.

In response to this determination, the server computer can determine that the entity previously rendered in a low level of detail should be rendered in a relatively higher level of detail (e.g., an intermediate level of detail, a high level of detail, etc.). The server computer can re-optimize the cross-reality session based on the libraries, and generate a new iteration of the cross-reality session data and/or an update to make changes to the existing session. The updates and/or the cross-reality session data can be provided to the user device and/or the cross-reality equipment. The cross-reality session can be updated to avoid wasting resources on rendering objects or other entities that the user has no interest in, yet supporting the possibility that the user may wish to interact with or view that object in high detail.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for optimization of resource usage in cross-reality sessions will be described, according to an illustrative embodiment. The operating environment 100 shown in FIG. 1 includes a user device 102. According to some embodiments, the user device 102 can operate in communication with and/or as a part of a communications network ("network") 104, though this is not necessarily the case in all embodiments.

According to various embodiments of the concepts and technologies disclosed herein, the functionality of the user device 102 may be provided by one or more server computers, desktop computers, mobile telephones, laptop computers, tablet computers, set-top boxes, other computing systems, and the like. It should be understood that the functionality of the user device 102 can be provided by a single device, by two or more similar devices, and/or by two or more dissimilar devices. For purposes of describing the concepts and technologies disclosed herein, the user device 102 is described herein as a mobile phone or smartphone. It should be understood that this embodiment is illustrative, and should not be construed as being limiting in any way.

The user device 102 can execute an operating system (not labeled in FIG. 1) and one or more application programs such as, for example, a cross-reality application 106 (labeled "XR application" in FIG. 1). The operating system can include a computer program for controlling the operation of the user device 102. The cross-reality application 106 can include an executable program that can be configured to execute on top of the operating system to provide various functions as illustrated and described herein.

According to various embodiments of the concepts and technologies disclosed herein, the user device 102 also can include, or can communicate with, one or more sensors 108. Although the sensors 108 are shown as being part of the user device 102, it should be understood that in various embodiments of the concepts and technologies disclosed herein the sensors 108 can be included in other devices that can be in communication with the user device 102. In some embodiments, for example, the sensors 108 can be, and in some embodiments are, located in a cross-reality headset or other equipment (hereinafter collectively and/or generically referred to as "cross-reality equipment") 110. The cross-reality equipment 110 can be connected to, can communicate with, and/or otherwise can be associated with the user device 102. For example, a user 112 associated with the user device 102 can use the cross-reality equipment 110 for a cross-reality session. It should be understood that this example is illustrative, and therefore should not be construed as being limiting in any way.

According to various embodiments of the concepts and technologies disclosed herein, the cross-reality equipment can include various hardware devices and/or software elements. According to various embodiments, the cross-reality equipment 110 can include, but is not limited to, a computing device that can execute the cross-reality application 106 illustrated and described herein, a display device (e.g., a virtual reality or augmented reality headset, a stereoscopic display system, projection screen systems, etc.), sensory interfaces (e.g., haptic feedback devices, treadmills, step machines, fans and/or other wind generators, stationary bikes, etc.), motion capture cameras, sound systems (microphones, speakers, etc.), lighting devices, sensors such as the sensors 108 illustrated and described herein, combinations thereof, or the like. Although FIG. 1 only shows a virtual reality headset, it should be understood that this is merely representative of various types of cross-reality equipment 110 such as those examples listed above. The functionality and operation of cross-reality equipment 110 such as the examples listed above generally are understood.

According to various embodiments of the concepts and technologies disclosed herein, the sensors 108 can be configured to capture various conditions and/or states associated with the user 112 and/or an environment around the user 112. The conditions and/or states of the user 112 can include, but are not limited to, for example, images and/or video of a proximity around the user 112 and/or the cross-reality equipment 110; images and/or video of the user 112; eye movements, focus, and/or attention of the user 112; neurological activity associated with the user 112; movements of the user 112; speech and/or mood of the user 112; combinations thereof; or the like. As such, the sensors 108 can include, but are not limited to, one or more microphones, cameras or other imaging devices, electrodes, accelerometers, gyroscopes, other devices, combinations thereof, or the like. Because attention, movements, and/or other conditions and/or states of the user 112 can be determined in additional and/or other manners, it should be understood that these examples of the sensors 108 are illustrative, and therefore should not be construed as being limiting in any way.

The sensors 108 can be configured to capture conditions and/or states associated with the user 112 and to provide output (e.g., sensor readings, images, etc.) to the cross-reality equipment 110, the user device 102, and/or other devices. In some embodiments, for example, the user device 102 can communicate with the sensors 108 and can generate, based on output from the sensors 108, attention data 114. In some other embodiments, the cross-reality equipment 110 can generate the attention data 114. The attention data 114 can include one or more audio files (e.g., speech and/or other sounds generated by the user 112 and/or speakers of the cross-reality equipment 110, or the like); images and/or video (captured by one or more cameras) of the user 112; neurological activity of the user 112; attention information (e.g., information that defines where the attention of the user 112 is focused in an environment associated with the cross-reality session); orientation, movement, and/or motion associated with the user 112 and/or the cross-reality equipment 110; combinations thereof; or the like. In some other embodiments, the attention data 114 can include data that describes speech and/or sounds generated by the user 112, movements and/or interactions of the user 112, interest and/or attention of the user 112, combinations thereof, or the like. As will be explained in more detail herein, the attention data 114 can be used to define and/or optimize one or more scenes and/or environments associated with the cross-reality session.

According to various embodiments, the cross-reality application 106 can be configured to obtain cross-reality session data 116 (labeled "XR session data" in FIG. 1). According to various embodiments, including the illustrated embodiment, the cross-reality application 106 can obtain the cross-reality session data 116 from a cross-reality service 118 (labeled "XR service" in FIG. 1), which can be hosted by a device such as the server computer 120 illustrated in FIG. 1. Because the cross-reality session data 116 can be obtained from additional and/or alternative sources hosted at additional and/or alternative devices, it should be understood that this example is illustrative, and therefore should not be construed as being limiting in any way.

According to various embodiments of the concepts and technologies disclosed herein, the cross-reality session data 116 can include various types of information and/or data that can be used to create the cross-reality session. As shown in the illustrated embodiment, the cross-reality session data 116 can include, but is not limited to, entity data, rendering data, story data, audio data, sensory data, other data, and/or other information and/or data. The cross-reality session data 116 can include renderable graphics data (e.g., data that, when processed by a device, causes the device to present the cross-reality session) and/or information that can be used by a device to generate the cross-reality session. Because the cross-reality session data 116 can include additional and/or alternative data and/or information, it should be understood that the illustrated example is illustrative, and therefore should not be construed as being limiting in any way.

According to various embodiments, the entity data can describe and/or can represent one, more than one, or all entities (objects, materials, structures, characters, etc.) that are to appear and/or be used in the cross-reality session. In particular, as is explained in more detail herein, the cross-reality session data 116 can include, in some embodiments, identification of the entities of a cross-reality session, where the user device 102 can generate renderable graphics corresponding to the scene of the cross-reality session based on the cross-reality session data 116. In some other embodiments the cross-reality session data 116 can include renderable graphics corresponding to the entities of the cross-reality session and therefore the user device 102 may only render the renderable graphics (instead of generating the graphics data). In yet other embodiments of the concepts and technologies disclosed herein, the cross-reality session data 116 can include both renderable graphics and information used to generate the renderable graphics, as well as other aspects of the cross-reality session (e.g., audio, storylines, characters, etc.). As such, the entity data of the cross-reality session data 116 can indicate entities (e.g., objects, materials, structures, audio, wind, scents, touch inputs, characters, etc.) that are to appear in a cross-reality session, and/or can include renderable graphics (e.g., renderable data) that represents those entities.

According to various embodiments, the rendering data can specify a rendering level of detail (hereinafter collectively and/or generically referred to as "rendering level") for one or more of the entities (objects, materials, structures, textures, characters, etc.) that are to appear and/or are to be used in the cross-reality session, or a rendering level for renderable graphics that are provided in the cross-reality session data 116. Thus, the rendering data can define whether the various entities (e.g., the entities specified by entity data and/or other portions of the cross-reality session data 116) are to be rendered coarsely (e.g., low detail, etc.), medium detail, high detail, finely, and/or at other levels of rendering detail. Additionally, other aspects of the cross-reality session (e.g., scent, textures of touch interfaces, etc.) can be cached (and not implemented) at a low rendering level, and then implemented at high resolution levels (e.g., when attention is turned to the associated entity with which the texture, scent, or the like is associated). As noted above, some embodiments of the concepts and technologies disclosed herein include the cross-reality service 118 relying on the user device 102 (and/or other device that executes a cross-reality application such as the cross-reality application 106) to render some or all of the entities in a particular cross-reality session, while in some other embodiments, the cross-reality service 118 can render some or all of the entities in a particular cross-reality session.

As such, the rendering data can indicate a level of rendering (from coarse to fine, low to high, etc.) for one or more entities (e.g., objects, materials, structures, characters, textures, scents, etc.) that are to appear in a cross-reality session and/or that are represented by renderable data and/or references that represent those entities. Additionally, the rendering data can specify what device (e.g., the user device 102, the cross-reality equipment 110, the server computer 120, etc.) is to render the respective entities. For example, the rendering data can specify whether the user device 102 is to render a particular entity, whether the cross-reality service 118 will render the particular entity, or another device. It can be appreciated that the rendering data, in combination with the entity data, can define the entities in a cross-reality session, as well as how finely (or coarsely) respective entities should be rendered.

In some embodiments of the concepts and technologies disclosed herein, the story data can describe one or more plots, plans, storylines, or the like, associated with the cross-reality session. Thus, the story data can describe paths and/or sub-environments included in the cross-reality environment 122 (labeled "XR environment" in FIG. 1), a path or paths that the point of view will move through in the cross-reality environment 122, and/or other aspects of the storyline associated with the cross-reality session. The story data can be used to specify and/or to determine a likely and/or known path (in the cross-reality environment 122) of a character or characters (e.g., the user 112 and/or an associated avatar, character, or the like), when characters will appear during the cross-reality session, where the appearance of characters will appear in the cross-reality session, and/or other aspects of the plot and/or storyline associated with a cross-reality session.

For example, the story data can indicate that a user perspective in the cross-reality environment 122 can begin at "point a," which can be a "distance a" from an "object a," and will end up at "point b," which can be a "distance b" from the "object a." It can be appreciated that in this example embodiment, the story data can be used by the cross-reality application 106 (or other application that renders aspects of the cross-reality environment 122 based on the cross-reality session data 116) to determine a rendering level that will be used at some point during the cross-reality session. More particularly, the rendering data can define an initial rendering level, while the story data can be used to determine a rendering level at some other point in the story (e.g., when the user perspective is at "point b," the rendering level will change from the initial rendering level). It should be understood that this example is illustrative, and therefore should not be construed as being limiting in any way.

It therefore can be understood that the story data, rendering data, and entity data can be used to define rendering levels for entities (e.g., objects, materials, structures, characters, etc.) that are to appear in a cross-reality session and/or renderable data that represents those entities, not only at some initial loading time, but also at other times during the cross-reality session. Furthermore, as explained herein, the attention of the user 112 can be used to further refine the rendering level, in some embodiments. It should be understood that this example is illustrative, and therefore should not be construed as being limiting in any way.

According to various embodiments of the concepts and technologies disclosed herein, the audio data can define sounds, music, speech, and/or other audio associated with the cross-reality session. Thus, the audio data can define, for example, sounds that are to be output to speakers included in the cross-reality equipment 110 and/or elsewhere. The audio data therefore can include one or more audio files including recordings, samples and/or samplings, loops, speech generator input, combinations thereof, or the like. The audio data can be used to preload audio before the audio is needed, in some embodiments, to reduce resource usage at the time the audio is needed in the scene. Because other sounds and/or audio are possible and are contemplated, and because the audio data can be used for additional and/or alternative purposes, it should be understood that these above examples are illustrative, and therefore should not be construed as being limiting in any way.

According to various embodiments of the concepts and technologies disclosed herein, the sensory data can include data that can define sensory outputs that are to be generated by one or more sensory interfaces (illustrated as part of the cross-reality equipment 110 in FIG. 1). As such, the sensory data can define a sensory interface output to be generated in association with an entity in a cross-reality session (e.g., a smell associated with a flower, a texture to be output on a touch display, other haptic outputs, a feeling of a material, etc.). Thus, the sensory data can be used to define what a particular entity in a cross-reality session feels like, smells like, etc. As such, the sensory data also can be used to pre-load environmental changes in terms of sensory interfaces, thereby reducing resource loads when an interaction occurs (since the changes have been preloaded and/or cached). Because other sensory interface inputs/outputs are contemplated and are possible, and because the sensory data can be used in additional and/or alternative manners, it should be understood that these above examples are illustrative, and therefore should not be construed as being limiting in any way.

According to various embodiments of the concepts and technologies disclosed herein, the other data can include other types of information that can be used to generate the cross-reality session such as, for example, four dimensional inputs/outputs such as water sprayers; movements of chairs, mounts, or other structures on which or in which the user 112 is located, e.g., during the cross-reality session; or any other data that may be included to create the cross-reality environment 122. Because additional and/or alternative data can be included in the cross-reality session data 116, it should be understood that these examples are illustrative, and therefore should not be construed as being limiting in any way.

According to various embodiments of the concepts and technologies disclosed herein, the cross-reality application 106 can obtain the cross-reality session data 116 and render and/or otherwise create a cross-reality environment 122. More particularly, the cross-reality application 106 can obtain the cross-reality session data 116 and create a cross-reality environment 122 based on the cross-reality session data 116, where the cross-reality environment 122 can include visual elements, audio elements, touch elements, and/or other elements. It can be appreciated that the cross-reality environment 122 can include a completely virtual environment (e.g., a virtual reality environment), a partially virtual environment (e.g., an augmented reality environment), other types of environments, and/or combinations thereof.

Thus, it should be appreciated that the cross-reality session data 116 received by the user device 102 can define various contours of the cross-reality environment 122 such as, for example, definitions of materials depicted in the cross-reality environment 122, definitions of surfaces and/or structures depicted in the cross-reality environment 122, characters depicted in the cross-reality environment 122, and/or other aspects of the cross-reality environment 122 that is to be created by the cross-reality application 106, in some embodiments; or renderable data that, when rendered by the cross-reality application 106, can correspond to these and/or other elements of the cross-reality environment 122. It further can be appreciated that the cross-reality environment 122 can include, in some embodiments, a blend of virtual and/or other rendered objects and/or surfaces, as well as photographs and/or live video of the real world and/or other physical surroundings (hereinafter collectively and/or generically referred to as the "physical environment 124") around the user 112 and/or the cross-reality equipment 110.

According to various embodiments of the concepts and technologies disclosed herein, the cross-reality application 106 can be configured to obtain information and/or readings form the sensors 108, where this information and/or sensor readings can relate to the cross-reality environment 122 (e.g., attention of the user 112 in the cross-reality environment 122, movements of the user 112 and/or the cross-reality equipment 110 in the cross-reality environment 122 and/or the physical environment 124, and the like). The cross-reality application 106 can also be configured to interact with the cross-reality service 118. According to various embodiments, the cross-reality application 106 can interact with the cross-reality service 118 to monitor the cross-reality environment 122, the physical environment 124, and/or the user 112 to identify a focus of attention of the user 112, and to optimize delivery of content such as, for example, the cross-reality session data 116 to the user device 102 and/or other devices and/or entities. It can be appreciated that in various embodiments, the sensors 108 can be located in the cross-reality equipment 110, as noted above.

As briefly mentioned above, the cross-reality application 106 can be configured to generate and/or capture one or more instances or streams of attention data 114 and to provide the attention data 114 to the cross-reality service 118. The attention data 114 can include or reference information that can define a view and/or views associated with the cross-reality environment 122, representations of objects in the cross-reality environment 122, representations of materials and/or surfaces in the cross-reality environment 122, compositions of objects in the cross-reality environment 122, and attention and/or interactions between the user 112 and these and/or other components of the cross-reality environment 122.

Thus, the attention data 114 can include data that depicts and/or represents a focus of attention of the user 112 in the cross-reality environment 122. As such, the attention data 114 can depict, represent, and/or identify objects and/or structures in the cross-reality environment 122 that the user 112 is looking at, touching, smelling, interacting with, and/or otherwise experiencing during the cross-reality session (e.g., in the cross-reality environment 122). The user device 102 can generate and/or capture the attention data 114 by monitoring the views and/or other experiences generated by the cross-reality application 106, monitoring attention and/or interactions between the user 112 and the cross-reality environment 122, and generating the attention data 114 based on the monitored views and/or interactions. In some other embodiments, the cross-reality equipment 110 can generate the attention data 114 and may, or may not, provide the attention data 114 to the user device 102. Because the attention data 114 can be generated by other devices and/or applications, it should be understood that this example is illustrative, and therefore should not be construed as being limiting in any way.

As noted above, the user device 102 (or other device that can incorporate the functionality of the user device 102 such as, for example, the cross-reality equipment 110) can provide the attention data 114 to the cross-reality service 118, for example by sending the attention data 114 (or commanding other devices to send the attention data 114) to the server computer 120. According to various embodiments of the concepts and technologies disclosed herein, the server computer 120 can obtain the attention data 114. In some embodiments, the server computer 120 can receive or otherwise obtain (e.g., request) the attention data 114 from the user device 102, while in some other embodiments the server computer 120 can receive or otherwise obtain the attention data 114 from the user device 102 or one or more other devices. Because the attention data 114 can be obtained by the cross-reality service 118 in additional and/or alternative manners, it should be understood that the above examples are illustrative, and therefore should not be construed as being limiting in any way.

The cross-reality service 118 can be configured to predict and/or determine what objects, structures, and/or other aspects of the cross-reality environment 122 will be interacted with and/or are being interacted with by the user 112. The cross-reality service 118 also can be configured to optimize delivery of content (e.g., the cross-reality session data 116) to the user device 102 based on the predicted and/or determined attention of the user 112. In some embodiments of the concepts and technologies disclosed herein, the cross-reality service 118 can obtain the attention data 114 from the user device 102 (or other device used in association with the cross-reality session). The cross-reality service 118 can analyze the attention data 114 to identify one or more aspects of the cross-reality environment 122 that are predicted to be, or are being, interacted with by the user 112. For objects and/or other aspects of the cross-reality environment 122 that are not being interacted with (or predicted to be interacted with) by the user 112, the cross-reality service 118 can be configured to manage the rendering of those objects and/or other aspects to optimize resource usage (e.g., network resource usage, processing resource usage, data storage usage, etc.) associated with the cross-reality session. In particular, the cross-reality service 118 can perform various operations to optimize content delivery during the cross-reality session, as will be explained in more detail herein.

In some embodiments, the cross-reality service 118 can detect or receive a request for a cross-reality session, where this request can be associated with the user device 102. In some embodiments, the cross-reality service 118 can determine, based on the requested cross-reality session, how to optimize resource usage during the cross-reality session. In particular, according to various embodiments of the concepts and technologies disclosed herein, optimization of resource usage during the cross-reality session can include the cross-reality service 118 determining an attention of the user 112 (either actual or predicted), and determining the complexity of objects and/or other entities in the cross-reality session based on the predicted and/or determined attention of the user 112. In some embodiments, the cross-reality service 118 can access one or more libraries 126 that can be stored at the server computer 120 and/or in communication with the server computer 120. It should be understood that this example is illustrative, and therefore should not be construed as being limiting in any way.

According to some embodiments of the concepts and technologies disclosed herein, the libraries 126 can include one or more profiles associated with the user 112, one or more pattern libraries, one or more entity libraries, one or more material libraries, one or more user history libraries, one or more optimization libraries, and/or other information that can be used by the cross-reality service 118 to determine with how much detail and/or complexity a particular object or other entity in a cross-reality session should be rendered, and/or the timing of rendering or providing various aspects of the cross-reality session to a user 112. The libraries 126 also can be used to enable recycling and/or reuse of content, materials, objects, audio, renderings, etc., as will be illustrated and described in more detail herein.

The pattern libraries can include one or more models or patterns for cross-reality sessions. The pattern libraries can define certain types of cross-reality sessions and/or the associated expected storylines, plots, user movements, user interactions, etc., for cross-reality sessions. The pattern libraries can be accessed, in some embodiments, during optimization of the rendering as disclosed herein. More particularly, the server computer 120 can access the pattern libraries to identify one or more patterns associated with the cross-reality session, and to access previously rendered and/or generated cross-reality sessions to avoid computing all aspects of the requested cross-reality session. The pattern libraries can be updated any time a new pattern, storyline, plot, or the like is detected. The patterns can be used, in some embodiments, to optimize the generating and/or rendering of cross-reality sessions. It should be understood that this example is illustrative, and therefore should not be construed as being limiting in any way.

The entity libraries can include one or more models or references to models for one or more entities. In some embodiments of the concepts and technologies disclosed herein, the entity libraries can store models and/or references to models (e.g., remotely stored models) for one, more than one, and/or all entities in a cross-reality session. Thus, the entity libraries can store definitions of specific objects, materials, structures, conditions, etc., where those definitions can be reused and/or recycled in multiple cross-reality sessions. Thus, for example, if a requested cross-reality session includes a tree, the entity libraries of the libraries 126 can be accessed by the server computer 120 and/or other devices or entities to obtain a model for the tree, instead of requiring the server computer 120 (or other device) to render the tree from start to finish (this can be a compute resource intensive process). It should be understood that this example is illustrative, and therefore should not be construed as being limiting in any way.

In another example, if the cross-reality session is to include a field of flowers, the entity libraries can define reusable and/or repeatable flowers (e.g., flower patterns) that can be used for low rendering level renderings of the field of flowers (with flowers only being rendered in high detail during an interaction with the flowers and/or when focusing on the flowers, etc.). It should be understood that this example is illustrative, and therefore should not be construed as being limiting in any way. The entity libraries can be updated any time a new object or other entity is rendered, in some embodiments, to be used to optimize the generating and/or rendering of cross-reality sessions.

The material libraries can include one or more types of data that can describe materials used in cross-reality sessions. The material libraries can define, for example, what the material looks like, whether the material should be rendered at the server computer 120, the user device 102, or other devices, what the material feels like (e.g., what sensory interfaces to activate when interacting with this material), and/or other aspects of the material, where such aspects can be used to create the cross-reality environment 122 including a representation of that material. The material libraries can be accessed, in some embodiments, during optimization of the rendering as disclosed herein.

More particularly, the server computer 120 can access the material libraries to identify one or more materials associated with the cross-reality session, to determine where rendering and/or other processes associated with that material should occur during the cross-reality session, and to access previously rendered and/or generated cross-reality sessions that include that material, thereby possibly avoiding computing all aspects of the requested cross-reality session. In some embodiments, the material libraries can be updated any time a new material is detected in a cross-reality session. The material libraries can be used, in some embodiments, to optimize the generating and/or rendering of cross-reality sessions that include that material. Because the material libraries can be used for additional and/or alternative purposes, it should be understood that this example is illustrative, and therefore should not be construed as being limiting in any way.

The user history libraries can include one or more user histories for one or more cross-reality sessions. The user history libraries can define, for example, movements of the user 112 through a cross-reality environment 122, interactions of the user 112 during the cross-reality session, eye movements and/or attention of the user 112 during the cross-reality session, and/or other aspects of how the user moved in and/or interacted with the cross-reality session. The user history libraries can be accessed, in some embodiments, during optimization of the rendering as disclosed herein. More particularly, the server computer 120 can access the user history libraries to predict and/or project how the user 112 will interact with entities in the cross-reality environment 122, how the user 112 will navigate the cross-reality environment 122, what types of objects or specific objects attract the attention and/or focus of the user 112, etc. Thus, the user history libraries can be used to determine what objects to render, when to render the objects, at what level of detail to render the objects, etc. The user history libraries can be updated, in some embodiments, whenever the user 112 has a cross-reality session. The user history libraries can be used, in some embodiments, to optimize the generating and/or rendering of cross-reality sessions for the user based on known and/or anticipated interactions and/or movements. Because the user history libraries can be used for additional and/or alternative purposes, it should be understood that this example is illustrative, and therefore should not be construed as being limiting in any way.

The optimization libraries can include one or more optimizations for one or more cross-reality sessions. The optimizations therefore can define, for a particular cross-reality session, user, entity, etc., how optimization of resource usage was or is being achieved. Thus, the optimization libraries can be accessed during a cross-reality session to update optimizations for the cross-reality session, and/or for other reasons. The optimization libraries can be updated, in some embodiments, whenever an interaction and/or change in attention results in the re-optimization of the cross-reality session, or at other times. Because the optimization libraries can be used for additional and/or alternative purposes, it should be understood that this example is illustrative, and therefore should not be construed as being limiting in any way.

In some embodiments, the libraries 126 stored at the server computer 120 can be synchronized with other libraries stored at other devices. For example, in some embodiments, the server computer 120 can generate an update 128 and send the update 128 to the user device 102 or the cross-reality equipment 110 whenever the libraries 126 at the server computer 120 are updated. In response to receiving the update 128, the user device 102 or the cross-reality equipment 110 can be configured to update the local libraries 130, which can be substantially similar to the libraries 126 (or even identical to each other, in some embodiments). Similarly, the user device 102 or the cross-reality equipment 110 can update the libraries 126 at the server computer 120 when the local libraries 130 are updated. At any rate, the use of the local libraries 130 can enable the use of references. For example, the server computer 120 can determine that a particular material is to be included in the cross-reality session. The server computer 120 can include a reference to that material in the cross-reality session data 116, and the user device 102 or other device can access the local libraries 130 to access an object or definition for that material without accessing external devices. Thus, the libraries 126 and local libraries 130 can be used to optimize delivery of the cross-reality session by obviating the transmission of material definitions (by using references instead), which can help improve the customer experience, can reduce network resource usage, and/or can otherwise optimize resource usage. It should be understood that this example is illustrative, and therefore should not be construed as being limiting in any way.

In practice, according to various embodiments of the concepts and technologies disclosed herein, the server computer 120 can obtain a request for a cross-reality session, for example in response to a request received from the user device 102. The server computer 120 can be configured to generate the cross-reality session based on various models and/or software (not separately illustrated in FIG. 1). According to embodiments of the concepts and technologies disclosed herein, the server computer 120 can be configured to optimize delivery of the cross-reality session.

In particular, the server computer 120 can access the libraries 126 and/or other information to determine how to optimize resource usage during providing of the cross-reality session to the user 112 and/or other entity associated with the requesting device. As used herein, "resources" can include network resources (e.g., available network bandwidth, network devices, and the like); processing resources (e.g., CPU cycles and/or other computational processes of processors and/or devices, including rendering of graphics); data storage resources (e.g., storage space, storage bandwidth and/or capabilities); and time resources (e.g., latency for network connections and/or time to deliver data). The server computer 120 can access the libraries 126 to determine what the cross-reality session is going to include and anticipated resource usage information (e.g., how much data needs to be stored, how much computation needs to occur, how much data needs to be transmitted, etc.). The server computer 120 can then optimize usage of the resources and/or performance for the user 112 based on various considerations.

In particular, performance of the resources during the cross-reality session can affect the realism and/or other aspects of the cross-reality session, and therefore can affect the user experience. Some embodiments of the concepts and technologies disclosed herein include the server computer 120 (via execution of the cross-reality service 118) optimizing resource usage, thereby attempting to optimize the user experience. In various embodiments of the concepts and technologies disclosed herein, the server computer 120 can, upon receiving the request for a cross-reality session, analyze the requested cross-reality session and determine what the requested cross-reality session is to include. The server computer 120 can access the libraries 126 to determine how to optimize the cross-reality session and/or the delivery of the cross-reality session.

According to various embodiments, the server computer 120 can determine resource usage associated with delivering the cross-reality session (e.g., how much compute resources, storage resources, network resources, etc. will be required to deliver the cross-reality session) and resource availability expected during delivery of the cross-reality session (e.g., for one or more or all resources involved in the cross-reality session, what availability exists to provide for the resource needs). Based on the predictions of resource needs or demand and resource availability, the server computer 120 can determine how to distribute computing, rendering, and/or other tasks associated with delivering and/or interacting with the cross-reality session across the various resources (e.g., devices) involved in the cross-reality session.

The server computer 120 can determine, in some embodiments, that instructing the user device 102 or other device to generate renderable data associated with some entities may be preferred, that generating the renderable data at the server computer 120 for some entities may be preferred, that generating renderable data at other devices may be preferred, combinations thereof, or the like. According to various embodiments, the server computer 120 can determine the optimal distribution of generating renderable data based on latency, available compute resources, network conditions, combinations thereof, or the like. Because the server computer 120 can optimize the distribution of renderable data generation across devices for additional and/or alternative purposes, it should be understood that this example is illustrative, and therefore should not be construed as being limiting in any way.

As part of this optimization process, the server computer 120 also can access the libraries 126 to identify patterns that exist in the requested cross-reality session, entities that exist in the requested cross-reality session, models and/or rendered versions of entities that exist in the requested cross-reality session, user histories and/or user profiles associated with the user 112 associated with cross-reality session; combinations thereof; or the like. Based on these and/or other considerations, the server computer 120 can determine if entities should be rendered at the server computer 120, the user device 102, and/or the cross-reality equipment 110; to what level of detail the entities should be rendered; the timing of rendering the entities; if interactions with the entities are expected during the cross-reality session; combinations thereof; or the like. Thus, the server computer 120 can identify patterns in the cross-reality session, determine rendering and/or other compute resource needs for the cross-reality session, determine resource availability during the cross-reality session, distribute compute and/or rendering operations associated with the cross-reality session, determine how to deliver the optimized rendering plan, and/or perform other operations. It should be understood that this example is illustrative, and therefore should not be construed as being limiting in any way.

Based on the optimization plan determined by the server computer 120, the server computer 120 can generate cross-reality session data 116. The cross-reality session data 116 can include at least one object or other entity rendered at a low level of detail (to reduce resource consumption). At some point during the cross-reality session, the server computer 120 can receive the attention data 114. Based on an analysis of the attention data 114, the server computer 120 can determine a focus of the user 112 during the cross-reality session, an item or other entity being interacted with by the user 112 in the cross-reality session, etc. The server computer 120 can determine that an optimization of the cross-reality session includes rendering the entity (previously rendered at a low level of detail) in a high level of detail. The server computer 120 can generate an update 128 and/or a new version of the cross-reality session data 116.

The updates 128 mentioned above can be generated and/or delivered by the server computer 120 to cause other devices (e.g., the user device 102, the cross-reality equipment 110, and/or other device) to render an entity at a different level of detail than the level of detail currently being used to render that entity. The updates 128 can be used for other purposes and/or reasons. The user device 102 or other device can update the cross-reality session based on the update 128. In some embodiments, the user device 102 can store the updated optimization (based on the update 128) in the local libraries 130. The user device 102 also can send an update or synchronization command (not shown in FIG. 1) to the server computer 120 to synchronize the local libraries 130 with the libraries 126, in some embodiments.

The user device 102 also can generate feedback 132, in some embodiments. The feedback 132 can be generated by the cross-reality application 106 and/or other applications. The feedback 132 can reflect the user experience, for example a level of engagement detected at the user device 102 and/or the cross-reality equipment 110; an interest in the cross-reality session; network bandwidth and/or performance measured at the user device 102 and/or the cross-reality equipment 110; user mood measured at the user device 102 and/or the cross-reality equipment 110; combinations thereof; or the like. The user device 102 can provide the feedback 132 to the server computer 120. The server computer 120 can use the feedback 132 to update the optimizations (e.g., based on a balance of the user experience indicators mentioned above and/or others) and/or the libraries 126 (e.g., update the user histories, among other things). It should be understood that this example is illustrative, and therefore should not be construed as being limiting in any way.

Thus, the concepts and technologies disclosed herein can be used to optimize resource usage in cross-reality sessions. To briefly summarize how the concepts and technologies disclosed herein can be implemented, according to various embodiments of the concepts and technologies disclosed herein, the user device 102 can request a cross-reality session from a cross-reality service 118. The cross-reality service 118 can determine contours of the cross-reality session and optimize aspects of the cross-reality session. For example, the cross-reality service 118 can determine whether entities in the cross-reality session are to be rendered in low detail, high detail, or intermediate detail; what device is to render the entities; whether that level of detail is likely to change during the cross-reality session; combinations thereof; or the like.

It can be appreciated that in various embodiments, rendering objects in low detail can use less computing resources than rendering the same objects in high detail. Similarly, in various embodiments, transmitting renderable graphics for an object rendered in high detail can consume more network resources than transmitting renderable graphics for an object rendered in low detail. Thus, rendering objects at a first level of detail that is higher than a second level of detail can consume more resources than rendering the same objects at the second level. The cross-reality service 118 also can determine resources that are expected to be needed to provide the cross-reality session, and resource availability (known or expected) during the cross-reality session.

Based on these and other considerations (as illustrated and described herein), the cross-reality service 118 can determine how to optimize resource usage during the cross-reality session, and can generate an optimized version of cross-reality session data 116. The cross-reality session data 116 can be used to generate the cross-reality session at cross-reality equipment 110. The cross-reality session data 116 also can instruct other devices (e.g., the user device 102, the cross-reality equipment 110, and/or other devices) to render and/or generate parts of the cross-reality session. In various embodiments, the cross-reality session data 116 can include at least one entity (e.g., an object) rendered at a low level of detail. The cross-reality session data 116 can be provided to the user device 102 and the cross-reality session can commence.

During the cross-reality session, the user device 102 (e.g., via execution of the cross-reality application 106) can track movements of the user 112, interactions of the user 112 with entities of the cross-reality environment 122, a focus of the user 112 (e.g., where the user 112 is looking) in the cross-reality environment 122, combinations thereof, or the like. The user device 102 (or other device) can generate attention data 114, which can represent movements and/or interactions of the user 112 in the cross-reality environment 122. In various embodiments, the attention data 114 can indicate that the user 112 (or the point of view of the user 112 in the cross-reality environment 122) has moved closer to and/or has interacted with the object or other entity rendered at a low level of detail.

In response to this determination, the server computer 120 can determine that the entity previously rendered at a low level of detail should be rendered at a relatively higher level of detail (e.g., an intermediate level of detail, a high level of detail, etc.). The server computer 120 can re-optimize the cross-reality session based on the libraries 126, and generate a new iteration of the cross-reality session data 116 and/or an update 128 to make changes to the existing session. The updates 128 and/or the cross-reality session data 116 can be provided to the user device 102 and/or the cross-reality equipment 110. The cross-reality session can be updated to avoid wasting resources on rendering objects or other entities that the user 112 has no interest in, yet supporting the possibility that the user 112 may wish to interact with or view that object in high detail. It should be understood that this example is illustrative, and therefore should not be construed as being limiting in any way.

It should be understood that the embodiment shown in FIG. 1 is illustrative of one contemplated embodiment of the concepts and technologies disclosed herein. In various embodiments, the functionality of the user device 102 can be incorporated into the cross-reality equipment 110, or the functionality of the cross-reality equipment 110 can be incorporated into the user device 102. Similarly, the functionality of the server computer 120 can be incorporated into the user device 102 and/or vice versa. As such, the illustrated and described embodiments are illustrative and should not be construed as being limiting in any way.

FIG. 1 illustrates one user device 102, one network 104, and one server computer 120. It should be understood, however, that various implementations of the operating environment 100 can include one or more than one user device 102; one or more than one network 104; and/or zero, one, or more than one server computer 120. As such, the illustrated embodiment should be understood as being illustrative, and should not be construed as being limiting in any way.

Figure 2A:
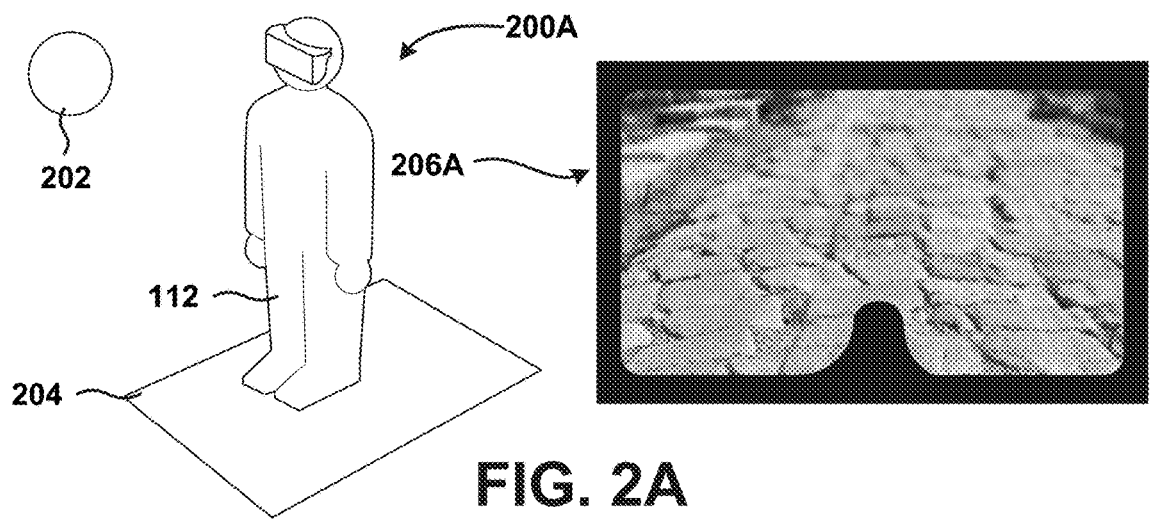
FIGS. 2A-2C depict an example use of the concepts and technologies disclosed herein for optimization of resource usage in cross-reality sessions, according to some illustrative embodiments of the concepts and technologies described herein.
Figure 2B:
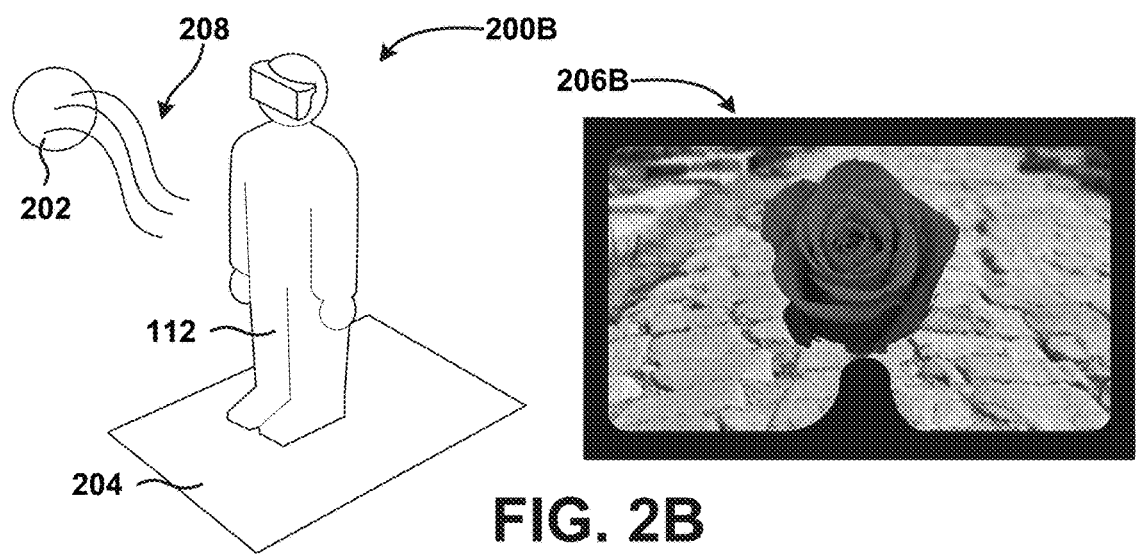
Figure 2C:
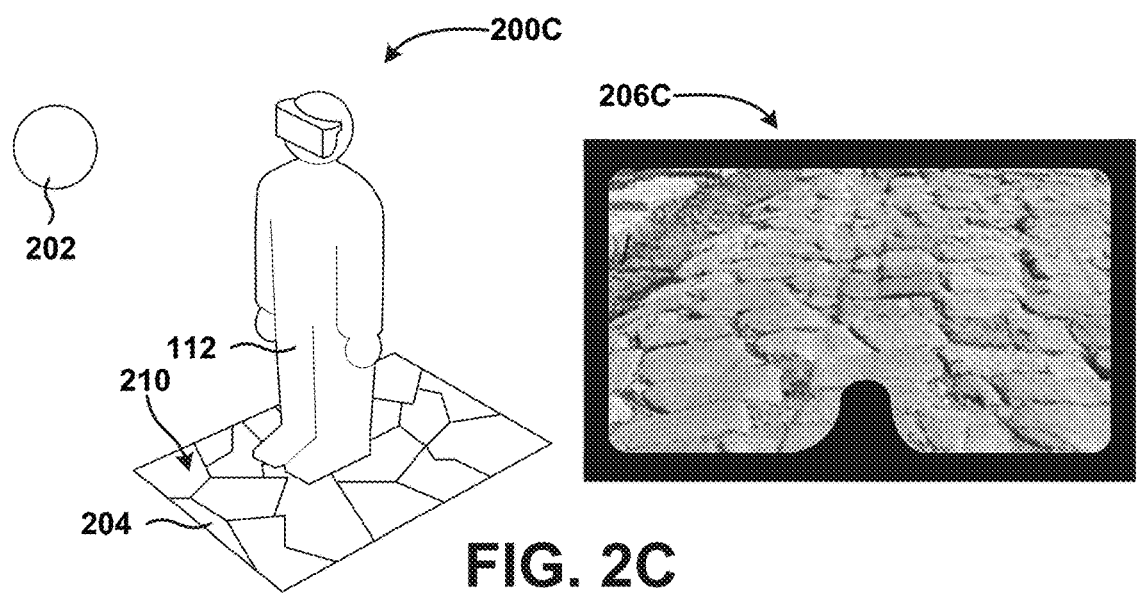

An example implementation of the concepts and technologies disclosed herein is illustrated in FIGS. 2A-2C. It should be understood that this illustrated example is merely illustrative of the concepts and technologies disclosed herein and therefore should not be construed as being limiting in any way. In FIG. 2A, an implementation environment 200A is illustrated, according to an example embodiment of the concepts and technologies disclosed herein. As shown in FIG. 2A, the user 112 is standing in proximity to a fan or wind generator ("fan") 202. The fan 202 can be used to simulate wind, in some embodiments, to generate and/or provide scents (e.g., from an incorporated scent generator), and/or for other purposes. In FIG. 2A, the fan 202 is not activated. It should be understood that this example is illustrative, and therefore should not be construed as being limiting in any way.

The user 112 is illustrated as standing on a sensory interface 204. In the illustrated embodiment, the sensory interface 204 can include a treadmill having an incorporated texture emulator. Thus, the sensory interface 204 shown in FIG. 2A can simulate different surfaces (e.g., rocks, sand, cobblestone, etc.), and also can move (e.g., in a manner similar to a treadmill) to enable the user 112 to walk "through" the cross-reality environment 122. It should be understood that this example is illustrative, and therefore should not be construed as being limiting in any way. A sample view 206A that the user 112 could see in a virtual reality or cross-reality headset at this example point in time is shown in FIG. 2A as well. It should be understood that this example is illustrative, and therefore should not be construed as being limiting in any way.

As shown in the sample view 206A, a cobblestone street is shown. Because the user 112 may be most interested in the part of the street nearest his or her point of view, the cross-reality service 118 that generated the cross-reality session data 116 used to generate the scene depicted in FIG. 2A has rendered the street at a low level of detail other than at a point closest to the user 112. Based on the illustrated and described embodiments herein, it can be appreciated that this determination can be based on resource usage and/or demand, user interactions in the past, etc. The movements and/or focus of the user 112, however, can be monitored during the session, as can interactions with other objects and/or entities in the cross-reality session.

In the illustrated embodiment, the cross-reality session includes a rose (not shown in FIG. 2A). Thus, a rose scent and a rendering of the rose can be stored and/or cached to be presented if the user 112 interacts with the rose. Furthermore, in some embodiments, it can be appreciated that the rose could be depicted in FIG. 2A and rendered at a low level of detail since it the rose has not yet been interacted with, though this is not shown in FIG. 2A. It should be understood that this example is illustrative, and therefore should not be construed as being limiting in any way.

Turning now to FIG. 2B, an implementation environment 200B is illustrated wherein the sample view 206B has been changed and the rose is now presented. This sample view 206B can be generated in response to detecting an interaction between the user 112 and the cross-reality environment 122 in a manner that indicates that the user 112 wishes to see the rose in more detail. As shown in FIG. 2B, the rose is rendered at a high level of detail, based on this determination. Also, it can be appreciated that the street is still rendered in low detail because the focus of the user 112 is on the rose. It should be understood that this example is illustrative, and therefore should not be construed as being limiting in any way.

It can be appreciated with reference to FIG. 1 that upon interacting with the rose, attention data 114 can be generated and sent to the cross-reality service 118 and/or the cross-reality application 106 (which in some embodiments can perform the functionality of the cross-reality service 118 illustrated and described herein). An updated version of the cross-reality session data 116 (or an update 128) can be provided and the cross-reality environment 122 can be updated to show the rose in high detail. Also, as shown in FIG. 2B, the fan 202 has activated and is blowing the rose scent 208 toward the user 112 so the user "smells" the rose during the interaction. It should be understood that this example is illustrative, and therefore should not be construed as being limiting in any way.

Turning now to FIG. 2C, an implementation environment 200C is illustrated wherein the sample view 206C has been changed and the rose is no longer presented. In this sample view 206C, however, the user 112 has now focused on the street in the cross-reality environment 122. In response to detecting this focus, attention data 114 can again be generated and the update 128 and/or new version of the cross-reality session data 116 can be generated as explained herein. Thus, as shown in FIG. 2C, the street is now rendered at a high level of detail. Also, as shown in FIG. 2C, the fan 202 has deactivated and is no longer blowing the rose scent 208 toward the user 112. Additionally, the sensory interface 204 has activated and created ridges 210 to simulate the cobblestone street, whereas previously these ridges were not required as they were not a focus of the user 112. Thus, it can be appreciated with reference to FIGS. 2A-2C that the cross-reality environment 122 can be dynamically updated based on interactions of the user 112 and/or attention of the user 112. It should be understood that this example is illustrative, and therefore should not be construed as being limiting in any way.

Figure 3:
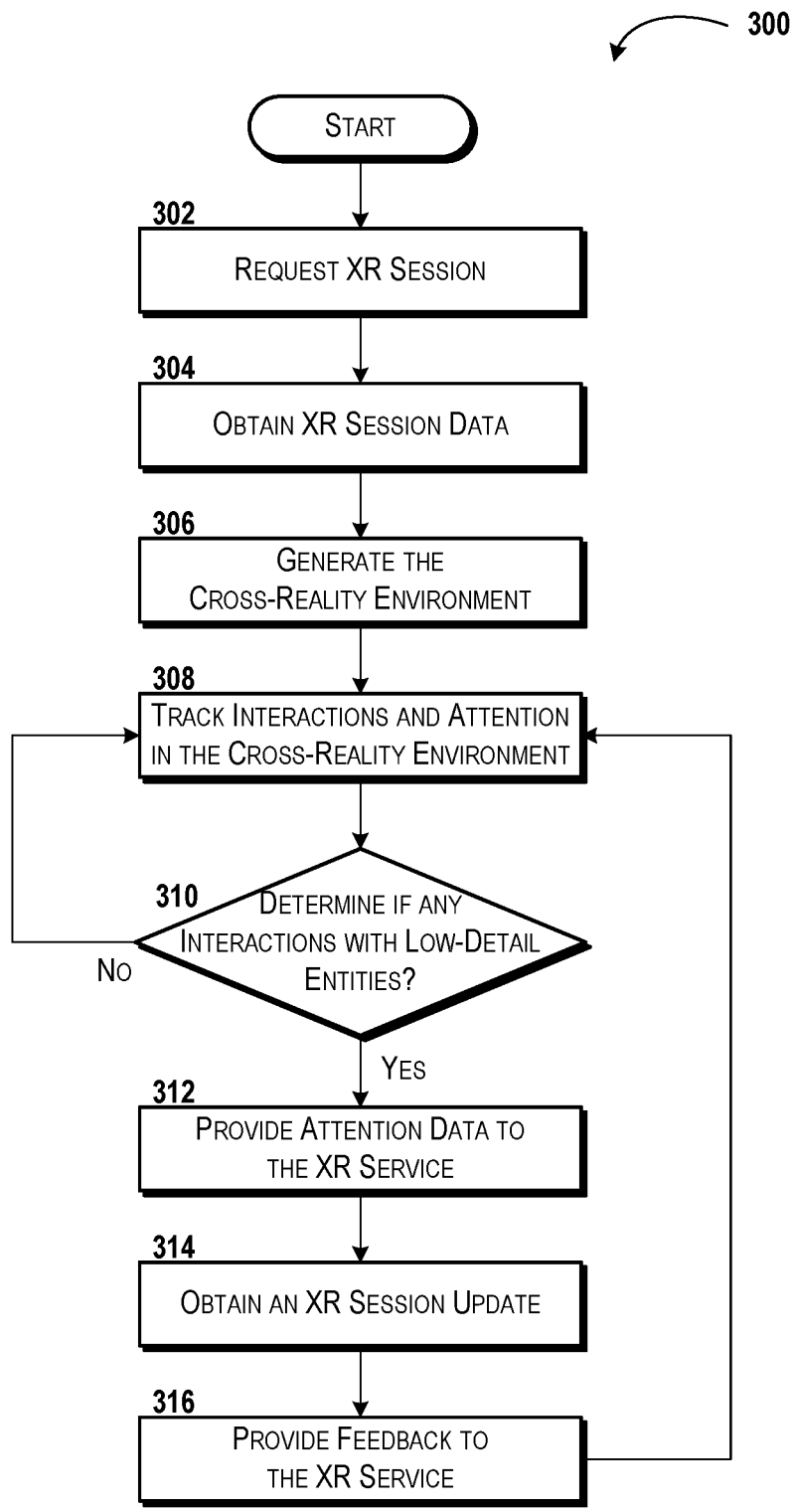
FIG. 3 is a flow diagram showing aspects of a method for providing optimization of resource usage in cross-reality sessions, according to an illustrative embodiment of the concepts and technologies described herein.

Turning now to FIG. 3, aspects of a method 300 for providing optimization of resource usage in cross-reality sessions will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 120, the user device 102, and/or the cross-reality equipment 110 to perform one or more operations and/or causing the processor to direct other components of the computing system or device to perform one or more of the operations.

For purposes of illustrating and describing the concepts of the present disclosure, the method 300 is described herein as being performed by the user device 102 via execution of one or more software modules such as, for example, the cross-reality application 106. It should be understood that additional and/or alternative devices and/or network nodes can provide the functionality described herein via execution of one or more modules, applications, and/or other software including, but not limited to, the cross-reality application 106. Thus, the illustrated embodiments are illustrative, and should not be viewed as being limiting in any way.

The method 300 can begin at operation 302. At operation 302, the user device 102 can request a cross-reality session. In some embodiments, the user device 102 can request the cross-reality session from a device or service such as, for example, the cross-reality service 118. According to various embodiments of the concepts and technologies disclosed herein, the user device 102 can request the cross-reality session by starting an application (e.g., the cross-reality application 106), by interacting with the cross-reality service 118 (e.g., via a portal, web interface, API, or other functionality associated with the cross-reality service 118), and/or by otherwise interacting with the user device 102, the cross-reality equipment 110, the cross-reality service 118, and/or other devices and/or entities. Thus, the request in operation 302 can include an explicit request (e.g., a request, service call, or the like), an implicit request (e.g., starting an application such as the cross-reality application 106 and/or entering input to begin a cross-reality session), and/or combinations thereof. Because the cross-reality session can be requested in additional and/or alternative manners, it should be understood that these examples are illustrative, and therefore should not be construed as being limiting in any way.

From operation 302, the method 300 can proceed to operation 304. At operation 304, the user device 102 can obtain cross-reality session data 116, for example from the cross-reality service 118. In operation 304, the user device 102 can receive a response to the request generated and/or sent in operation 302. Thus, in operation 304, the user device 102 can obtain the cross-reality session data 116, which can be used to create the cross-reality session. It can be appreciated that the cross-reality session data 116 received in operation 304 can include renderable data (e.g., graphical data that, when rendered, causes the user device 102 to present a rendered environment), instructions for using other cross-reality equipment 110 (e.g., audio files for output on speakers, haptic files for output on sensory interfaces), character descriptions, material descriptions, storylines, combinations thereof, or the like. In some other embodiments, the cross-reality session data 116 can include references to objects, materials, etc., that can be used by the user device 102 or other devices to generate renderable data.

According to various embodiments of the concepts and technologies disclosed herein, the cross-reality session data 116 can include entity data. As explained above, the entity data can describe entities (objects, materials, structures, characters, etc.) that are to appear and/or be used in the cross-reality session. In some embodiments, the cross-reality service 118 can rely on the user device 102 (and/or other device that executes a cross-reality application such as the cross-reality application 106) to render some or all of the entities in a particular cross-reality session, while in some other embodiments, the cross-reality service 118 can render some or all of the entities in a particular cross-reality session. As such, the entity data can indicate entities (e.g., objects, materials, structures, characters, etc.) that are to appear in a cross-reality session and/or renderable data that represents those entities.

As explained above, the rendering data can specify a rendering level for entities (objects, materials, structures, characters, etc.) that are to appear and/or are to be used in the cross-reality session. Thus, the rendering data can define whether the various entities (e.g., the entities specified by entity data and/or other portions of the cross-reality session data 116) are to be rendered coarsely, finely, etc. As used herein, a "coarsely" rendered entity can also be referred to as an entity rendered in low detail, and a "finely" rendered entity can also be referred to as an entity rendered in high detail. In some embodiments, the cross-reality service 118 can rely on the user device 102 (and/or other device that executes a cross-reality application such as the cross-reality application 106) to render some or all of the entities in a particular cross-reality session, while in some other embodiments, the cross-reality service 118 can render some or all of the entities in a particular cross-reality session.

As such, the rendering data can indicate a level of rendering (from coarse to fine) for entities (e.g., objects, materials, structures, characters, etc.) that are to appear in a cross-reality session and/or renderable data that represents those entities. Additionally, the rendering data can specify what device is to render the respective entities. For example, the rendering data can specify whether the user device 102 is to render a particular entity, or whether the cross-reality service 118 will render the particular entity. It can be appreciated that the rendering data, in combination with the entity data, can define the entities in a cross-reality session, as well as how finely (or coarsely) respective entities should be rendered.

As explained above, the story data can describe one or more plots or storylines associated with the cross-reality session. Thus, the story data can describe paths and/or sub-environments included in the cross-reality environment 122. The story data can be used to determine a likely and/or known path (in the cross-reality environment 122) of a character or characters (e.g., the user 112 and/or an associated avatar, character, or the like), the appearance of characters in the cross-reality session, and/or other aspects of the plot and/or storyline associated with a cross-reality session. Thus, for example, the story data can indicate that a user perspective in the cross-reality environment 122 can begin at "point a," which can be a "distance a" from an "object a," and end up at "point b," which can be a "distance b" from the "object a."

It can be appreciated that in this example embodiment, the story data can be used by the cross-reality application 106 (or other application that renders aspects of the cross-reality environment 122 based on the cross-reality session data 116) to determine a rendering level that will be used at some point during the cross-reality session. More particular, the rendering data can define an initial rendering level, while the story data can be used to determine a rendering level at some other point in the story (e.g., when the user perspective is at "point b," the rendering level will change from the initial rendering level. It should be understood that this example is illustrative, and therefore should not be construed as being limiting in any way.

As noted above, the cross-reality session data 116 also can include audio data. The audio data can define sounds, music, speech, and/or other audio associated with the cross-reality session. Thus, the audio data can define, for example, sounds that are to be output to speakers included in the cross-reality equipment 110 and/or elsewhere. The audio data therefore can include one or more audio files including recordings, samples and/or samplings, loops, speech generator input, combinations thereof, or the like. Because other sounds and/or audio are possible and are contemplated, it should be understood that these examples are illustrative, and therefore should not be construed as being limiting in any way.

As noted above, the cross-reality session data 116 can include sensory data. The sensory data can include data that can define sensory outputs that are to be generated by one or more sensory interfaces (illustrated as part of the cross-reality equipment 110 in FIG. 1). As such, the sensory data can define a sensory interface output to be generated in association with an entity in a cross-reality session (e.g., a smell associated with a flower, a feeling of a material, etc.). Thus, the sensory data can be used to define what a particular entity in a cross-reality session feels like, smells like, etc. Because other sensory interface inputs/outputs are contemplated and are possible, it should be understood that these examples are illustrative, and therefore should not be construed as being limiting in any way.

As noted above, the cross-reality session data 116 can include other data. The other data can include other types of information that can be used to generate the cross-reality session such as, for example, four dimensional inputs/outputs such as water sprayers; movements of chairs, mounts, or other structures; or any other data that may be included to create the cross-reality environment 122. Because additional and/or alternative data can be included in the cross-reality session data 116, it should be understood that these examples are illustrative, and therefore should not be construed as being limiting in any way.

It therefore can be understood that the story data, rendering data, entity data, audio data, sensory data, other data, and/or other information included in the cross-reality session data 116 can be used to define rendering levels for entities (e.g., objects, materials, structures, characters, etc.) that are to appear in a cross-reality session and/or renderable data that represents those entities, not only at some initial loading time, but also at other times during the cross-reality session; where such entities are to be rendered; sensory and/or audio outputs to be generated at various times and/or "locations" in the cross-reality session, combinations thereof, or the like. Furthermore, as explained herein, the attention of the user 112 can be used to further refine the rendering level and/or sensory interface output for some entities in the cross-reality session, in some embodiments. Thus, operation 304 can include obtaining these and/or other types of information. It should be understood that this example is illustrative, and therefore should not be construed as being limiting in any way.

From operation 304, the method 300 can proceed to operation 306. At operation 306, the user device 102 can generate the cross-reality environment 122 associated with the cross-reality session requested in operation 302, for example, the cross-reality environment 122 illustrated in FIG. 1. In operation 306, the user device 102 can generate the cross-reality environment 122 by rendering graphical data for visual elements of the cross-reality environment 122, by generating and rendering graphical data for visual elements of the cross-reality environment 122, by outputting audio elements associated with the cross-reality session, by generating and outputting audio elements associated with the cross-reality session, by outputting sensory features of the cross-reality session to one or more sensory interfaces, by generating and outputting sensory features of the cross-reality session to one or more sensory interfaces, and/or by generating and/or outputting other aspects of the cross-reality session. It can be appreciated that the level of detail included in the generated and/or output data can be based on the cross-reality session data 116 received in operation 304.

From operation 306, the method 300 can proceed to operation 308. At operation 308, the user device 102 can track interactions and attention in the cross-reality environment 122. According to various embodiments of the concepts and technologies disclosed herein, the sensors 108 can track movements and/or attention of the user 112 during the cross-reality session (e.g., attention to entities in the cross-reality environment 122, movements of limbs and/or the body during the cross-reality session, eye movements, etc.). The user device 102 can capture these and/or other interactions of the user 112 to determine a level of attention being directed to an entity in the cross-reality environment 122.

In some embodiments of the concepts and technologies disclosed herein, the user device 102 can determine a level of attention being directed to one or more and/or all entities in the cross-reality environment 122. Thus, for example, in a cross-reality environment 122 having ten entities (e.g., five objects, two characters, and three structures), the user device 102 can determine one or more attention levels, e.g., one attention level for each entity. Thus, in some embodiments a level of attention for one or more entities in the cross-reality environment 122 can be determined.

In some other embodiments, the user device 102 can determine a focus of attention of the user 112 (e.g., an object being looked at, touched, smelled, manipulated, and/or otherwise interacted with by the user 112 in the cross-reality environment 122). According to various embodiments of the concepts and technologies disclosed herein, the focus of attention can correspond to a viewing direction, to a viewing depth, and/or to an entity that corresponds to the focus of the attention of the user 112. As such, operation 308 can correspond to determining one or more entities that the user 112 is interacting with and/or focusing on, and/or a direction and/or depth of focus of the user 112. It should be understood that these examples are illustrative, and therefore should not be construed as being limiting in any way.

From operation 308, the method 300 can proceed to operation 310. At operation 310, the user device 102 can determine if any interactions with low-detail entities has occurred in the cross-reality environment 122. In some embodiments, the user device 102 can make the determination of operation 310 by determining if the focus of attention and/or one or more subject(s) of interactions determined in operation 308 are rendered in low detail, medium detail, high detail, or the like. For example, when a cross-reality environment 122 is rendered, the point of view of the user 112 in the cross-reality environment 122 may be a first distance x from an object, and at some example point in time, the point of view of the user 112 may be a second distance y from the object (where y can be less than x). According to various embodiments of the concepts and technologies disclosed herein, a first render level applied to the object may be a low level of rendering, while a second render level applied to the object may be a higher level of rendering (given that the point of view of the user 112 is closer to the object in the second case). It should be understood that this example is illustrative, and therefore should not be construed as being limiting in any way.

If the user device 102 determines, in operation 310, that no interactions with low-detail entities have occurred in the cross-reality environment 122, the method 300 can return to operation 310. Thus, it can be appreciated that operation 310 can be repeated until the user device 102 determines, in any interaction of operation 310, that an interaction with a low detail entity has occurred in the cross-reality environment 122. It should be understood that a "low detail" entity for purposes of operation 310 can refer to an entity that is rendered in anything less than the maximum level of detail possible for the cross-reality session, and is not in absolute terms. Thus, it can be appreciated that operation 310 can be performed to determine if an entity being focused on and/or interacted with should be rendered in additional detail. It should be understood that this example is illustrative, and therefore should not be construed as being limiting in any way.

If the user device 102 determines, in operation 310, that an interaction with a low-detail entity has occurred in the cross-reality environment 122, the method 300 can proceed to operation 312. At operation 312, the user device 102 can provide attention data 114 to the cross-reality service 118. In particular, the user device 102 can be configured to generate attention data 114, which can define the focus of the user 112 in the cross-reality environment 122. Based on the above description, it can be appreciated that the attention data 114 therefore can define an entity that the user 112 is interacting with and/or focusing on, as well as a viewing direction, viewing angle, depth of focus, etc. The attention data 114 therefore can be interpreted to determine what the user 112 is looking at and/or interacting with in the cross-reality environment 122. This attention data 114 can be provided to the cross-reality service 118 in operation 312.

According to various embodiments of the concepts and technologies disclosed herein, the user device 102 can provide the attention data 114 to the cross-reality service 118 directly. In some other embodiments, the user device 102 can direct other devices and/or entities to provide the attention data 114 to the cross-reality service 118. In some other embodiments, the cross-reality service 118 can request the attention data 114 from the user device 102 or other device, and the user device 102 or other device can provide the attention data 114 in response to the request. Thus, it should be understood that the attention data 114 can be provided to the cross-reality service 118 in a number of manners, and the above-described examples should not be construed as being limiting in any way.

From operation 312, the method 300 can proceed to operation 314. At operation 314, the user device 102 can obtain an update 128. The update 128 can include one or more commands, one or more instances of graphical data, and/or other types of data. In some embodiments, the update 128 obtained in operation 314 can correspond to a new instance of the cross-reality session data 116, though this is not necessarily the case. As noted above, the update 128 can include a new version of renderable graphics for an object, or an instruction to the user device 102 and/or other device (e.g., the cross-reality equipment 110) to render the object at a higher level of detail. Thus, the update 128 can take various forms, but in any rate can result in a higher detail of rendering for the object. Thus, the update 128 obtained in operation 314 can, when received, trigger the receiving device or other device to provide additional detail for the object. It should be understood that this example is illustrative, and therefore should not be construed as being limiting in any way.

From operation 314, the method 300 can proceed to operation 316. At operation 316, the user device 102 can provide feedback 132 to the cross-reality service 118. The feedback 132 provided in operation 316 can be used by the cross-reality service 118 to update and/or synchronize libraries, to update and/or synchronize material definitions, to update and/or synchronize scenario definitions, combinations thereof, or the like. Thus, for example, if the user device 102 rendered an object or other entity in the cross-reality session, the user device 102 can provide the feedback 132 to the cross-reality service 118. The feedback 132 can include information about the rendered entity, thus enabling the cross-reality service 118 to render the entity in the future and/or to obtain additional information about the entity.

The feedback 132 also can be used to track user interest in the cross-reality session, network performance and/or computing resource performance during the cross-reality session, and/or the like. The cross-reality service 118 can use this information to change the optimization, in some embodiments, to maintain a desired balance between resource performance, user experience, user interest, and the like. Because other uses of the feedback 132 are possible and are contemplated, it should be understood that this example is illustrative, and therefore should not be construed as being limiting in any way.

From operation 316, the method 300 can return to operation 308. Thus, it can be appreciated that the repetition of operations 308-316 can continue until the cross-reality session ends, until optimization of resource usage is ceased, until the performance of the method 300 is ceased for other reasons, or, as noted above, at any other time.

Figure 4:
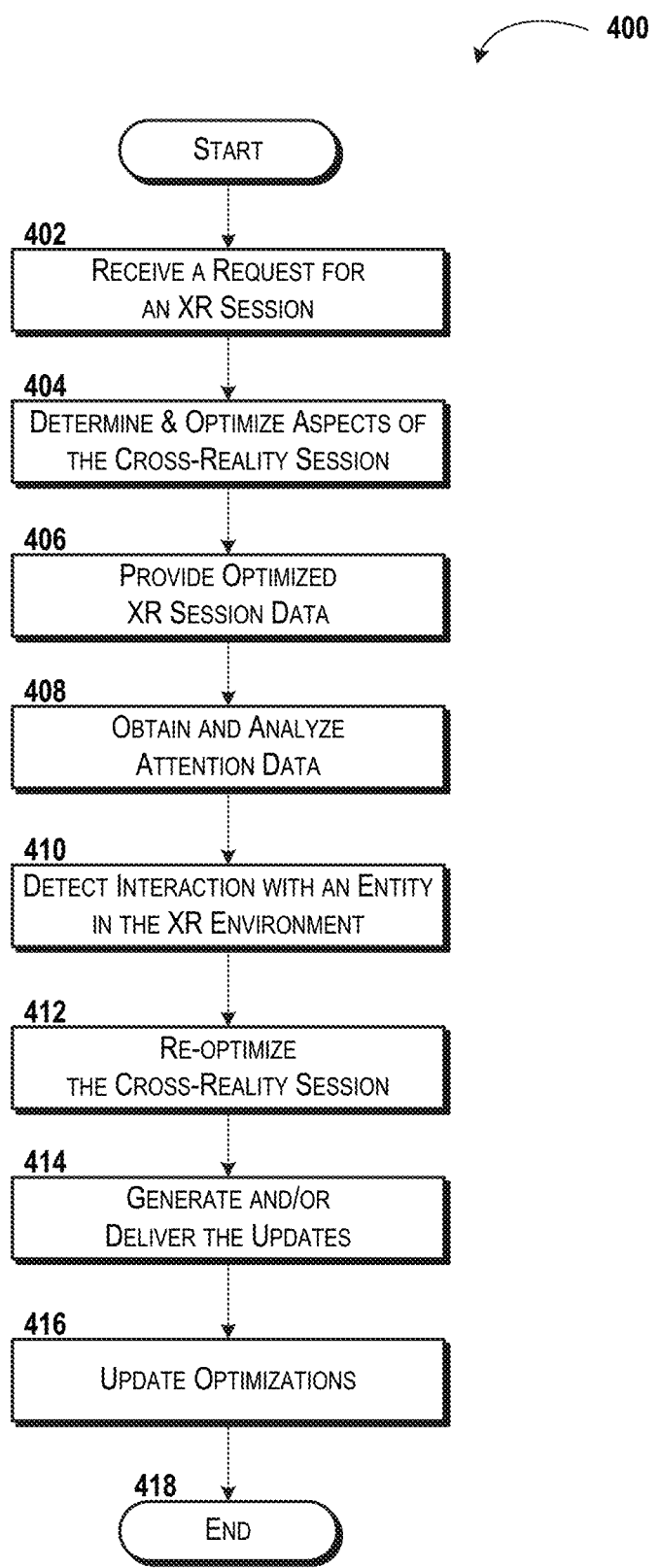
FIG. 4 is a flow diagram showing aspects of a method for providing optimization of resource usage in cross-reality sessions, according to additional aspects of an illustrative embodiment of the concepts and technologies described herein.

Turning now to FIG. 4, aspects of a method 400 for providing optimization of resource usage in cross-reality sessions will be described in detail, according to an illustrative embodiment. For purposes of illustrating and describing the concepts of the present disclosure, the method 400 is described herein as being performed by the server computer 120 via execution of one or more software modules such as, for example, the cross-reality service 118. It should be understood that additional and/or alternative devices and/or network nodes can provide the functionality described herein via execution of one or more modules, applications, and/or other software including, but not limited to, the cross-reality service 118. Thus, the illustrated embodiments are illustrative, and should not be viewed as being limiting in any way.

The method 400 begins at operation 402. At operation 402, the server computer 120 can receive a request for a cross-reality session. The request received in operation 402 can be received from one or more devices, applications, and/or services. According to various embodiments of the concepts and technologies disclosed herein, the user device 102 can request the cross-reality session from the cross-reality service 118 by starting an application (e.g., the cross-reality application 106), by interacting with the cross-reality service 118 (e.g., via a portal, web interface, API, or other functionality associated with and/or exposed by the cross-reality service 118), and/or by otherwise interacting with the user device 102, the cross-reality equipment 110, the cross-reality service 118, and/or other devices and/or entities. Thus, the request in operation 402 can include an explicit request (e.g., a request, service call, or the like), an implicit request (e.g., starting an application such as the cross-reality application 106 and/or entering input to begin a cross-reality session), and/or combinations thereof. Because the cross-reality session can be requested in additional and/or alternative manners, it should be understood that these examples are illustrative, and therefore should not be construed as being limiting in any way.

From operation 402, the method 400 can proceed to operation 404. At operation 404, the server computer 120 can determine and optimize aspects of the cross-reality session requested in operation 402. According to various embodiments, the optimization of aspects of the cross-reality session can include analyzing the cross-reality session (and/or scenes thereof) to determine aspects of the cross-reality session. Operation 404 also can include identifying patterns in the cross-reality session. The patterns can include, for example, repeating patterns and/or objects in the cross-reality session and/or an overall pattern of the cross-reality session (e.g., the storyline and/or plot of the cross-reality session).

Thus, the server computer 120 can, in operation 404, determine a plot and/or storyline of the requested cross-reality session and determine, based on the libraries 126, a pattern associated with the storyline and/or plot of the cross-reality session; objects and/or other entities that repeat in the cross-reality session; and/or other patterns associated with the cross-reality session. The identification of the patterns associated with the cross-reality session can enable the server computer 120 to access and/or reference previously rendered cross-reality sessions, objects or other entities, combinations thereof, or the like.

By way of example, if a cross-reality session includes a user 112 (or a virtual point of view associated with the user 112) walking through a field of flowers, the server computer 120 can determine that the flowers are to be repeated in a particular pattern. For optimization purposes, the server computer 120 can determine that rendering the flower once and repeating that rendered data at various depths and/or levels of detail may be preferred, from a resource usage standpoint, than rendering each flower in the cross-reality session. Thus, operation 404 can include the server computer 120 identifying such repeating objects and optimizing the rendering (level of detail, repeating of objects and/or other entities, etc.) based on identified repeating and/or existing models and/or object definitions in the libraries 126. It should be understood that this example is illustrative, and therefore should not be construed as being limiting in any way.

Operation 404 also can include the server computer 120 determining, based on various aspects of the requested cross-reality session, whether to distribute compute operations associated with rendering graphics of and/or other compute operations associated with the cross-reality session. In various embodiments, the server computer 120 (via execution of the cross-reality service 118, for example) can predict compute requirements associated with the cross-reality session. For example, if the story line of the cross-reality session includes the user 112 (or his or her point of view) walking into the field of flowers mentioned above, predicting compute requirements can include predicting a spike in demand for compute requirements based on the compute resources needed to render a virtual field of flowers. It should be understood that this example is illustrative, and therefore should not be construed as being limiting in any way.

At any rate, in operation 404, the server computer 120 can predict compute requirements associated with the cross-reality session, and can determine and/or predict availability of multiple devices and/or other entities involved in the cross-reality session, such as, for example, the user device 102, the cross-reality equipment 110, and the server computer 120. Thus, operation 404 can include predicting compute resources needed for the cross-reality session (over time) and predicting, over time, the availability of resources to fulfill those predicted needs. It can be appreciated that the predictions illustrated and described herein can be determined, at least in part, by accessing the libraries 126, which can store rendering statistics, availability information, etc. Also, the predictions can be changed based on the recycling and/or reuse of objects as illustrated and described herein. As such, it should be understood that the example provided above is illustrative, and therefore should not be construed as being limiting in any way.

Based, at least in part, on the predictions of demand and availability, the server computer 120 can determine how to distribute computing and/or rendering associated with the cross-reality session across the various devices involved in the cross-reality session. The server computer 120 can determine, in some embodiments, that instructing the user device 102 or other device (e.g., the cross-reality equipment 110) to generate renderable data associated with some entities may be preferred, that generating the renderable data at the server computer 120 for some entities rather than generating renderable data at other devices may be preferable, combinations thereof, or the like. According to various embodiments, the server computer 120 can determine the optimal distribution of generating renderable data based on latency, available compute resources, network conditions, combinations thereof, or the like. Because the server computer 120 can optimize the distribution of renderable data generation across devices for additional and/or alternative purposes, it should be understood that this example is illustrative, and therefore should not be construed as being limiting in any way.

Operation 404 also can include determining, if a model or pattern is identified, how to distribute the model and/or pattern from the libraries 126. In some embodiments, the server computer 120 can determine that a model or reference is to be distributed to the user device 102 (for example), and that the user device 102 will render the associated entity based on the model or reference. In some embodiments, for example, the user device 102 can receive the reference from the server computer 120, access the local libraries 130 to identify the referenced model, and render the object or other entity based on the model. It should be understood that this example is illustrative, and therefore should not be construed as being limiting in any way.

In some other embodiments, the server computer 120 can send the model and/or pattern to the user device 102 with one or more adaptations (to the model, the pattern, and/or to the properties associated therewith) to optimize resource usage. Still further, operation 404 can include the server computer 120 determining that the user device 102 (or other device) should render the object to optimize delivery. Thus, operation 404 can include identifying patterns in the cross-reality session, determining rendering and/or other compute resource needs for the cross-reality session, determining resource availability during the cross-reality session, distributing compute and/or rendering operations associated with the cross-reality session, determining how to deliver the optimized rendering plan, and/or other operations. It should be understood that this example is illustrative, and therefore should not be construed as being limiting in any way.

From operation 404, the method 400 can proceed to operation 406. At operation 406, the server computer 120 can provide the cross-reality session data 116 to the requestor, for example, the user device 102. It can be appreciated that the cross-reality session data 116 provided in operation 406 can be optimized by the server computer 120 as discussed above with reference to operation 404. It can be appreciated that after operation 406, there can be, but is not necessarily, a break or pause in operation of the method 400 as the recipient of the cross-reality session data 116 may begin the cross-reality session and may interact with an object or other entity in the cross-reality session. It should be understood that this example is illustrative, and therefore should not be construed as being limiting in any way.

From operation 406, the method 400 can proceed to operation 408. At operation 408, the server computer 120 can obtain and analyze attention data such as the attention data 114. As explained herein, the attention data 114 can describe a focus of the attention of the user 112, an interaction of the user 112 with an object or other entity in the cross-reality session, combinations thereof, or the like. Thus, operation 408 can correspond to the receipt of the attention data 114 sent by the user device 102, as illustrated and described in FIG. 3 with reference to operation 312. It should be understood that this example is illustrative, and therefore should not be construed as being limiting in any way.

From operation 408, the method 400 can proceed to operation 410. At operation 410, the server computer 120 can detect, based on the analysis of the attention data 114 in operation 408, an interaction with an entity (e.g., an object, a surface, or other entity) in the cross-reality environment 122. According to various embodiments of the concepts and technologies disclosed herein, the server computer 120 can perform operation 408 by analyzing attention data 114.

From operation 410, the method 400 can proceed to operation 412. At operation 412, the server computer 120 can re-optimize the cross-reality environment based on the detected interaction. It can be appreciated that the re-optimization of operation 412 can be similar to the optimization illustrated and described herein with reference to operation 404, as adjusted based on the attention data 114. Thus, operation 412 can include the optimization operations illustrated and described above with reference to operation 404 such as, for example, identifying new, changed, and/or original patterns in the cross-reality session, determining new, changed, and/or original rendering and/or other compute resource needs for the cross-reality session, determining new, changed, and/or original resource availability during the cross-reality session, distributing new, changed, and/or original compute and/or rendering operations associated with the cross-reality session, determining how to deliver the optimized rendering plan, and/or other operations. It should be understood that this example is illustrative, and therefore should not be construed as being limiting in any way.

From operation 412, the method 400 can proceed to operation 414. At operation 414, the server computer 120 can deliver one or more updates 128 to the user device 102 and/or other device providing the cross-reality session. According to various embodiments of the concepts and technologies disclosed herein, the updates 128 can include instructions for providing the cross-reality session (e.g., instructions for rendering a particular object or other entity at a particular level, at a particular device, etc.). Thus, operation 414 can include the server computer 120 generating the updates 128, in some embodiments, as well as delivering the updates 128 to a desired recipient. The recipient (e.g., the user device 102 and/or the cross-reality equipment 110) can be configured to update the rendering and/or other providing of one or more aspects of the cross-reality session based on the updates 128, in various embodiments.

In some embodiments of the method 400, operation 414 can include sending a new version of the cross-reality session data 116 (instead of an update 128). Thus, operation 414 can correspond to the server computer 120 sending a newly-optimized and/or re-optimized version of the cross-reality session data 116, and the user device 102 and/or other device can provide the cross-reality session based on the cross-reality session data 116. It should be understood that these examples are illustrative, and therefore should not be construed as being limiting in any way.

From operation 414, the method 400 can proceed to operation 416. At operation 416, the server computer 120 can update the optimizations, for example, the optimizations stored in the libraries 126. Thus, operation 416 can include the server computer 120 updating the libraries 126 to include the newly optimized (or re-optimized) aspects of the cross-reality session including, but not limited to, patterns, user histories, interaction information, rendering models and/or properties, rendering distribution plans and/or schemes, combinations thereof, or the like. Although not separately shown in FIG. 4, it should be understood that the server computer 120 can receive the feedback 132 from the user device 102 and/or other device and update the optimizations based on the feedback 132, in some embodiments. Thus, operation 416 can include receiving the feedback 132, in some embodiments. Because other aspects of the libraries 126 can be updated in accordance with the concepts and technologies disclosed herein, it should be understood that these examples are illustrative, and therefore should not be construed as being limiting in any way.

From operation 416, the method 400 can proceed to operation 418. The method 400 can end at operation 418.

It can be appreciated with collective reference to FIGS. 3-4 that some operations of the methods 300, 400 depicted in those FIGURES can be related to one another. In particular, the user device 102 can request the cross-reality session in operation 302 of the method 300 and the server computer 120 can receive the request in operation 402 of the method 400. The server computer 120 can provide the optimized version of the cross-reality session data 116 (also referred to as "optimized cross-reality session data") in operation 406 of the method 400 and the user device 102 can obtain the cross-reality session data 116 in operation 304 of the method 300. The user device 102 can provide the attention data 114 in operation 312 of the method 300, and the server computer 120 can obtain and analyze the attention data 114 in operation 408 of the method 400. The server computer 120 can deliver the updates 128 (or new version of the cross-reality session data 116) in operation 412 of the method 400 and the user device can obtain the cross-reality session update in operation 314 of the method 300. It should be understood that this example is illustrative, and therefore should not be construed as being limiting in any way.

Figure 5:
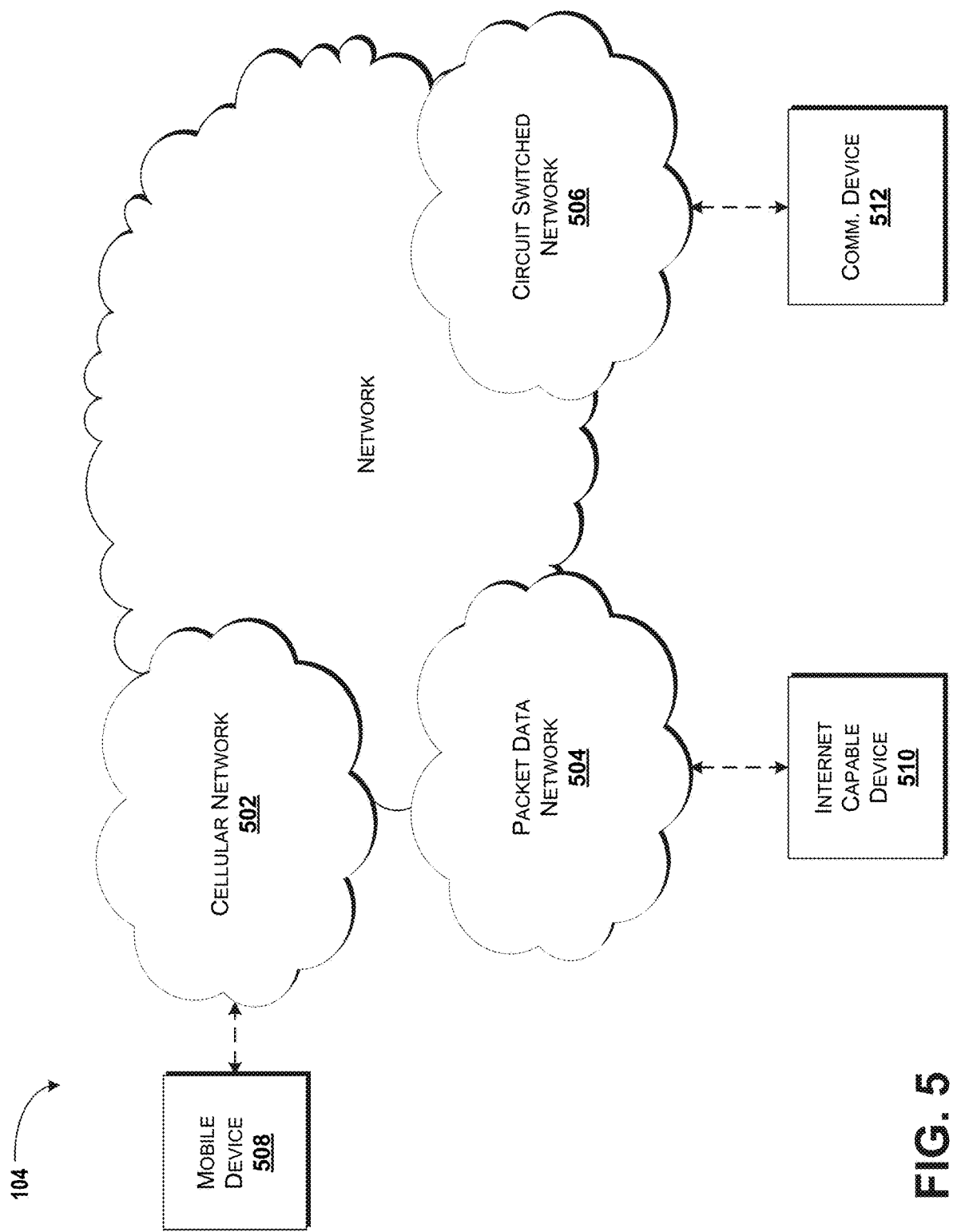
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
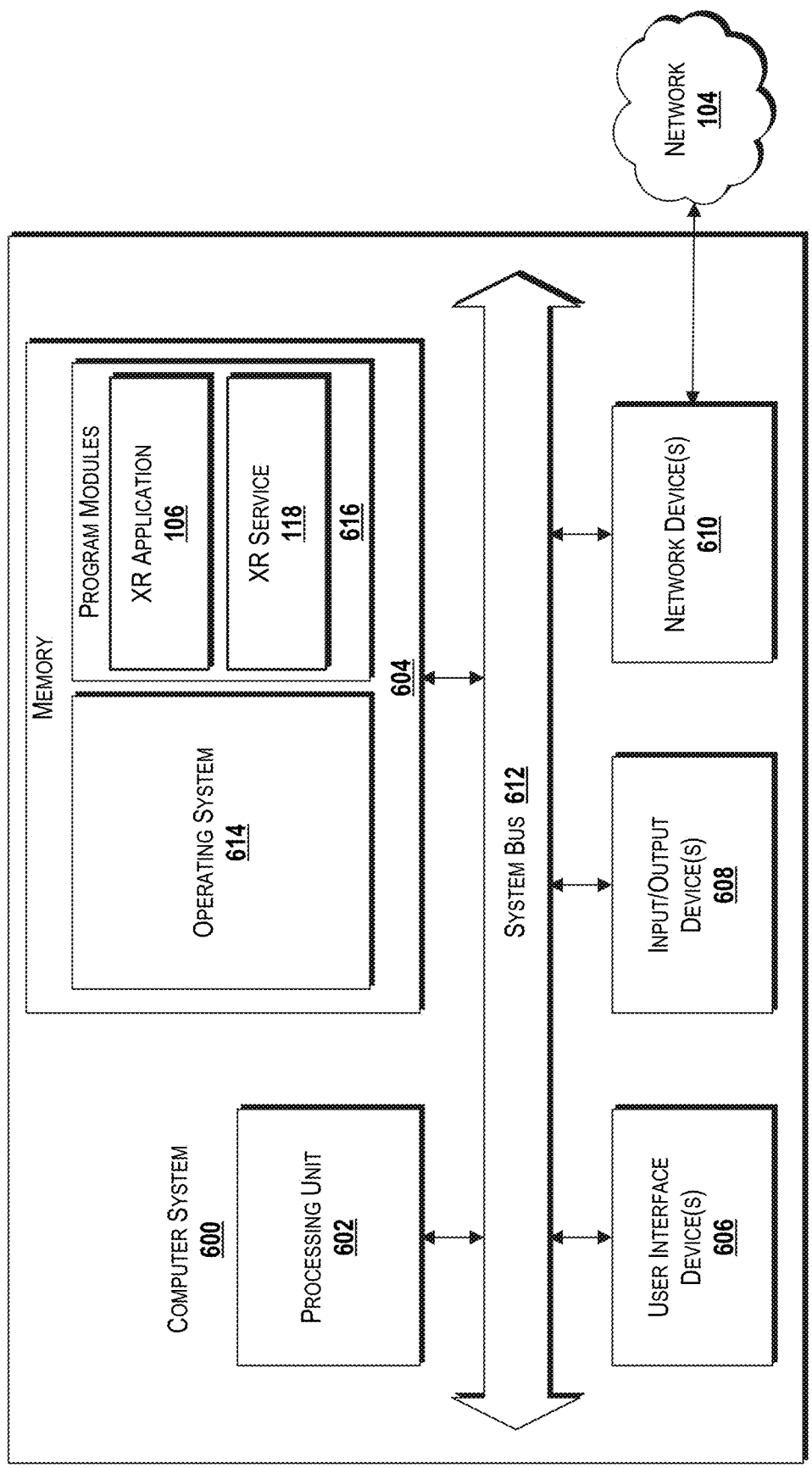
FIG. 6 is a block diagram illustrating an example computer system configured to optimize delivery of cross-reality content, according to some illustrative embodiments of the concepts and technologies described herein.

FIG. 6 is a block diagram illustrating a computer system 600 configured to provide the functionality described herein for optimization of resource usage in cross-reality sessions, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the cross-reality application 106 and the cross-reality service 118. These and/or other programs can be embodied in computer-readable media containing instructions that, when executed by the processing unit 602, perform one or more of the methods 300 and 400 described in detail above with respect to FIGS. 3-4 and/or other functionality as illustrated and described herein. It can be appreciated that, at least by virtue of the instructions embodying the methods 300 and 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the attention data 114, the cross-reality session data 116, the libraries 126, the updates 128, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
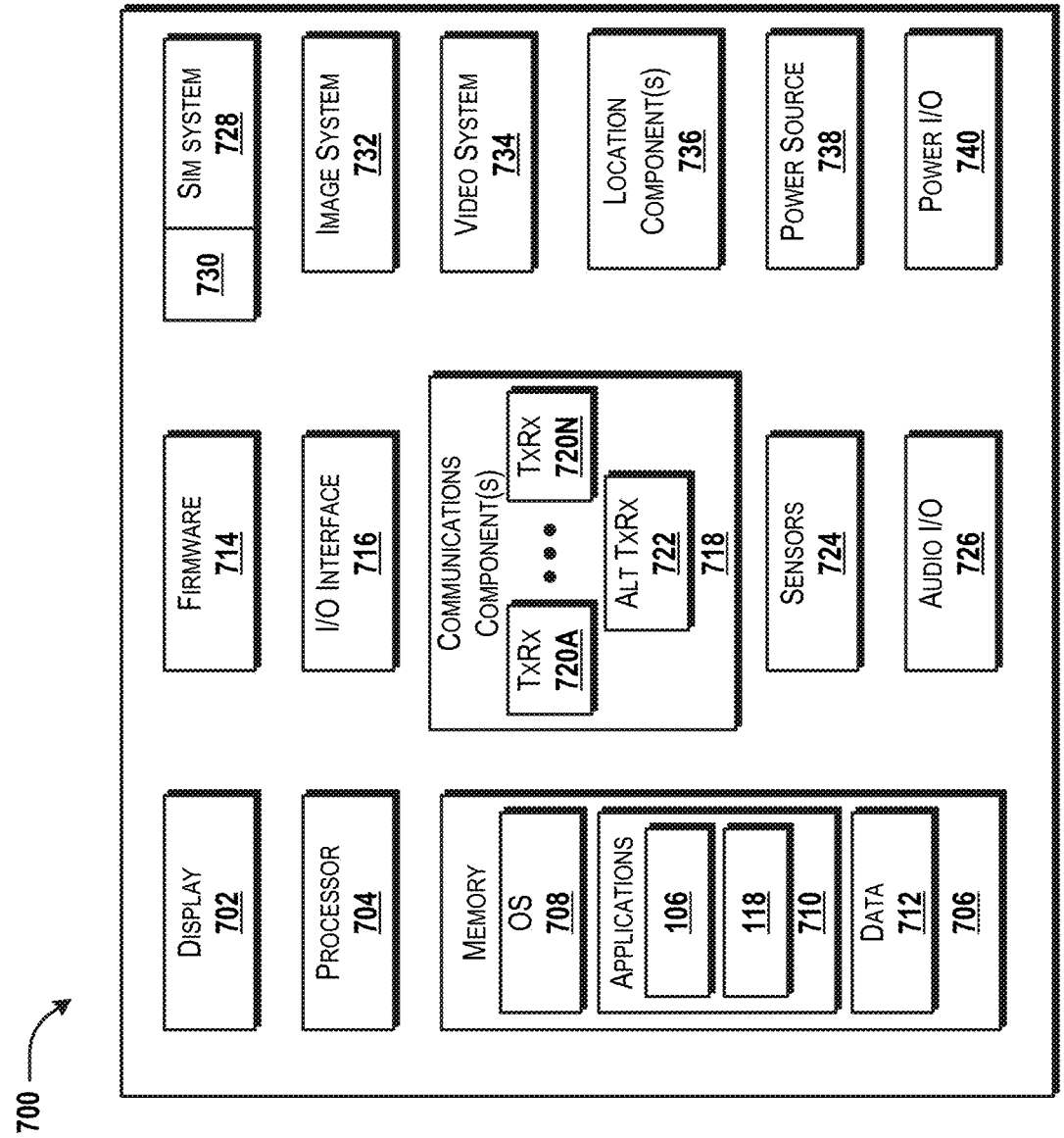
FIG. 7 is a block diagram illustrating an example mobile device configured to interact with a cross-reality service to optimize delivery of cross-reality content, according to some illustrative embodiments of the concepts and technologies described herein.

Turning now to FIG. 7, an illustrative mobile device 700 and components thereof will be described. In some embodiments, the user device 102 described above with reference to FIGS. 1-4 can be configured as and/or can have an architecture similar or identical to the mobile device 700 described herein in FIG. 7. It should be understood, however, that the user device 102 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements such as, for example, creating requests for cross-reality sessions, adjusting settings for a cross-reality application 106 and/or cross-reality service 118, displaying text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the cross-reality application 106 and/or the cross-reality service 118, other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, viewing content, requesting content, providing feedback, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the cross-reality application 106, the cross-reality service 118, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704.

It can be appreciated that, at least by virtue of storage of the instructions corresponding to the applications 710 and/or other instructions embodying other functionality illustrated and described herein in the memory 706, and/or by virtue of the instructions corresponding to the applications 710 and/or other instructions embodying other functionality illustrated and described herein being accessed and/or executed by the processor 704, the mobile device 700 is a special-purpose mobile device that can facilitate providing the functionality illustrated and described herein. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, the attention data 114, the cross-reality session data 116, the libraries 126, the updates 128, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSDPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/ WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/ or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
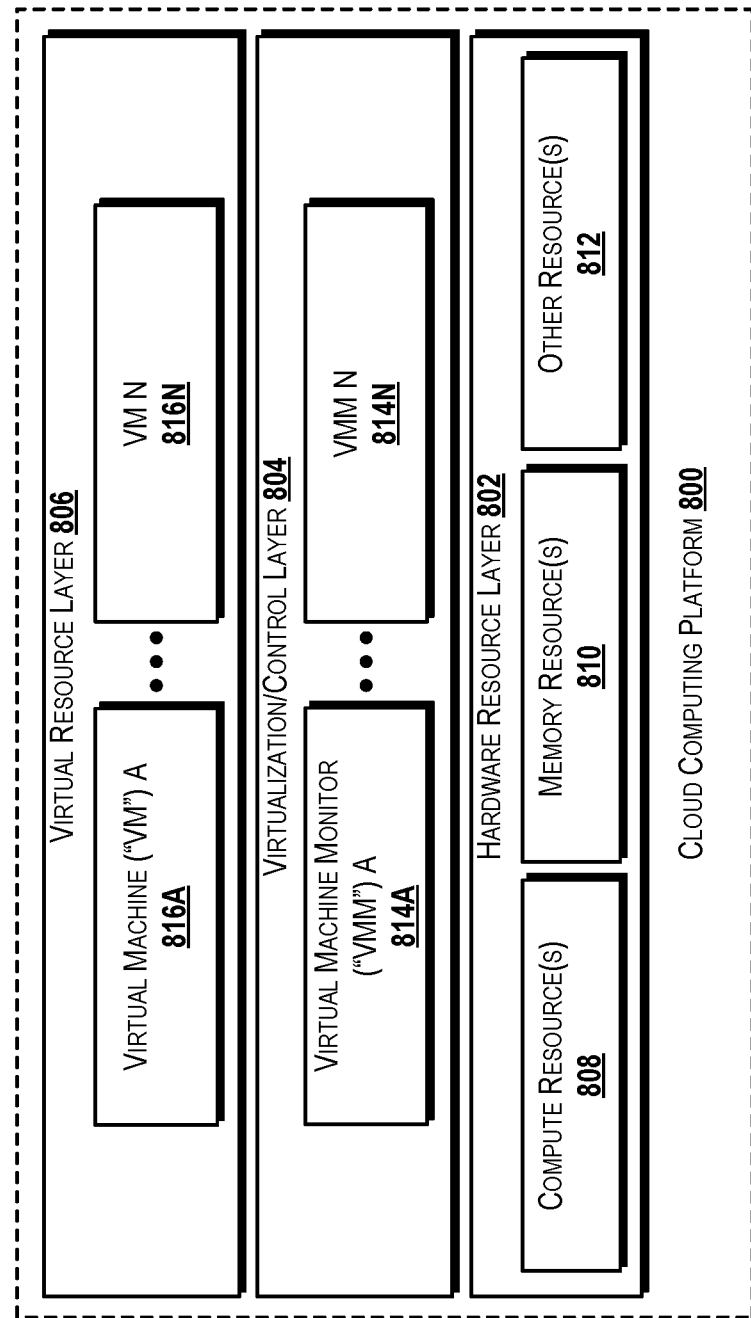
FIG. 8 is a diagram illustrating a cloud computing platform capable of implementing aspects of the concepts and technologies disclosed herein, according to some illustrative embodiments of the concepts and technologies described herein.

FIG. 8 illustrates an illustrative architecture for a cloud computing platform 800 that can be capable of executing the software components described herein for optimization of resource usage in cross-reality sessions and/or for interacting with the cross-reality application 106, the cross-reality service 118, and/or other applications and/or services. Thus, it can be appreciated that in some embodiments of the concepts and technologies disclosed herein, the cloud computing platform 800 illustrated in FIG. 8 can be used to provide the functionality described herein with respect to the user device 102, the server computer 120, and/or other devices illustrated and described herein.

The cloud computing platform 800 thus may be utilized to execute any aspects of the software components presented herein. Thus, according to various embodiments of the concepts and technologies disclosed herein, the cross-reality application 106 and/or the cross-reality service 118 can be implemented, at least in part, on or by elements included in the cloud computing platform 800 illustrated and described herein. Those skilled in the art will appreciate that the illustrated cloud computing platform 800 is a simplification of but only one possible implementation of an illustrative cloud computing platform, and as such, the illustrated cloud computing platform 800 should not be construed as being limiting in any way.

In the illustrated embodiment, the cloud computing platform 800 can include a hardware resource layer 802, a virtualization/control layer 804, and a virtual resource layer 806. These layers and/or other layers can be configured to cooperate with each other and/or other elements of a cloud computing platform 800 to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 808 can include one or more hardware components that can perform computations to process data, and/or to execute computer-executable instructions of one or more application programs, operating systems, services, and/or other software including, but not limited to, the cross-reality application 106, the cross-reality service 118, and/or other software illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that an SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, Calif., and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the cross-reality application 106, the cross-reality service 118, and/or other applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, the attention data 114, the cross-reality session data 116, the libraries 126, the updates 128, and/or other data, if desired. It should be understood that this example is illustrative, and therefore should not be construed as being limiting in any way.

The other resource(s) 812 can include any other hardware resources that can be utilized by the compute resources(s) 808 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814N (also known as "hypervisors;" hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems and methods for optimization of resource usage in cross-reality sessions have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:
1. A system comprising:
a processor; and
a memory that stores computer-executable instructions that, when executed by the processor, cause the processor to perform operations comprising
identifying, for a cross-reality session comprising presentation of a cross-reality environment, an entity that is to be rendered in the cross-reality environment in a first level of detail that is less than a maximum level of detail,
predicting, based on story data that describes a path during the cross-reality session, a first distance to the entity in the cross-reality session at a first time and a second distance to the entity at a second time,
determining, based on the first distance and the second distance, the first level of detail for the entity at the first time and a second level of detail for the entity at the second time,
providing, to a device, cross-reality session data, wherein the device renders, using the cross-reality session data, the cross-reality environment including the entity rendered by the device in the first level of detail at the first time,
obtaining, from the device, attention data that describes movement along the path, and
delivering, to the device, an update that causes the device to update the cross-reality environment to include the entity rendered by the device in the second level of detail at the second time.

2. The system of claim 1, wherein delivering the update further comprises generating the update.

3. The system of claim 1, wherein the attention data is generated by cross-reality equipment in communication with the device, and wherein the device sends, to the cross-reality equipment, rendered data for presenting the cross-reality environment at the cross-reality equipment.

4. The system of claim 1, wherein the device stores a local library that comprises a definition of a material, and wherein delivering the update comprises delivering, to the device, a reference to the material.

5. The system of claim 4, wherein the device is configured to receive the update, to retrieve the definition from the local library without accessing an external device, and to use the definition when rendering the entity in the second level of detail.

6. The system of claim 1, wherein the computer-executable instructions, when executed by the processor, cause the processor to perform operations comprising:
predicting, based on the story data, computing resources and networking resources that are to be used to provide the cross-reality session;
predicting an availability of the computing resources and the networking resources during the cross-reality session;
predicting an attention of a user during the cross-reality session; and
determining, for the entity, the first level of detail and the second level of detail based on the story data and the availability of the computing resources and the networking resources.

7. The system of claim 1, wherein the computer-executable instructions, when executed by the processor, cause the processor to perform operations further comprising:
receiving feedback from the device, the feedback describing network performance and attention of a user of the device during the cross-reality session; and
updating, based on the feedback, an optimization of the cross-reality session.

8. The system of claim 1, wherein the first distance comprises a first viewing distance from a user to the entity at the first time, and wherein the second distance comprises a second viewing distance from the user to the entity at the second time.

9. A method comprising:
identifying, at a computer comprising a processor and for a cross-reality session comprising presentation of a cross-reality environment, an entity that is to be rendered in the cross-reality environment in a first level of detail that is less than a maximum level of detail;
predicting, based on story data that describes a path during the cross-reality session, a first distance to the entity in the cross-reality session at a first time and a second distance to the entity at a second time;
determining, based on the first distance and the second distance, the first level of detail for the entity at the first time and a second level of detail for the entity at the second time;
providing, by the computer and to a device, cross-reality session data, wherein the device renders, using the cross-reality session data, the cross-reality environment including the entity rendered by the device in the first level of detail at the first time;
obtaining, by the computer and from the device, attention data that describes movement along the path; and
delivering, by the computer and to the device, an update that causes the device to update the cross-reality environment to include the entity rendered by the device in the second level of detail at the second time.

10. The method of claim 9, wherein the first distance comprises a first viewing distance from a user to the entity at the first time, and wherein the second distance comprises a second viewing distance from the user to the entity at the second time.

11. The method of claim 9, wherein the device stores a local library that comprises a definition of a material, and wherein delivering the update comprises delivering, to the device, a reference to the material.

12. The method of claim 11, wherein the device is configured to receive the update, to retrieve the definition from the local library without accessing an external device, and to use the definition when rendering the entity in the second level of detail.

13. The method of claim 9, further comprising:
predicting, based on the story data, computing resources and networking resources that are to be used to provide the cross-reality session;
predicting an availability of the computing resources and the networking resources during the cross-reality session;
predicting an attention of a user during the cross-reality session; and
determining, for the entity, the first level of detail and the second level of detail based on the story data and the availability of the computing resources and the networking resources.

14. The method of claim 9, further comprising:
receiving feedback from the device, the feedback describing network performance and attention of a user of the device during the cross-reality session; and
updating, based on the feedback, an optimization of the cross-reality session.

15. A computer storage medium having computer-executable instructions stored thereon that, when executed by a processor, cause the processor to perform operations comprising:
identifying, for a cross-reality session comprising presentation of a cross-reality environment, an entity that is to be rendered in the cross-reality environment in a first level of detail that is less than a maximum level of detail;
predicting, based on story data that describes a path during the cross-reality session, a first distance to the entity in the cross-reality session at a first time and a second distance to the entity at a second time;

determining, based on the first distance and the second distance, the first level of detail for the entity at the first time and a second level of detail for the entity at the second time;

providing, to a device, cross-reality session data, wherein the device renders, using the cross-reality session data, the cross-reality environment including the entity rendered by the device in the first level of detail at the first time;

obtaining, from the device, attention data that describes a movement along the path; and delivering, to the device, an update that causes the device to update the cross-reality environment to include the entity rendered by the device in the second level of detail at the second time.

16. The computer storage medium of claim 15, wherein the first distance comprises a first viewing distance from a user to the entity at the first time, and wherein the second distance comprises a second viewing distance from the user to the entity at the second time.

17. The computer storage medium of claim 15, wherein the device stores a local library that comprises a definition of a material, and wherein delivering the update comprises delivering, to the device, a reference to the material.

18. The computer storage medium of claim 17, wherein the device is configured to receive the update, to retrieve the definition from the local library without accessing an external device, and to use the definition when rendering the entity in the second level of detail.

19. The computer storage medium of claim 15, wherein the computer-executable instructions, when executed by the processor, cause the processor to perform operations further comprising:

predicting, based on the story data, computing resources and networking resources that are to be used to provide the cross-reality session;

predicting an availability of the computing resources and the networking resources during the cross-reality session;

predicting an attention of a user during the cross-reality session; and determining, for the entity, the first level of detail and the second level of detail based on the story data and the availability of the computing resources and the networking resources.

20. The computer storage medium of claim 15, wherein the computer-executable instructions, when executed by the processor, cause the processor to perform operations further comprising:

receiving feedback from the device, the feedback describing network performance and attention of a user of the device during the cross-reality session; and updating, based on the feedback, an optimization of the cross-reality session.

* * * * *